United States Patent
Chen

(10) Patent No.: US 12,321,658 B2
(45) Date of Patent: Jun. 3, 2025

(54) METHOD FOR DISPLAYING CONFERENCE SHARED SCREEN CONTENT, APPARATUS, AND SYSTEM

(71) Applicant: Huawei Technologies Co., Ltd., Shenzhen (CN)

(72) Inventor: Xianyi Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/335,243

(22) Filed: Jun. 15, 2023

(65) Prior Publication Data

US 2023/0325143 A1 Oct. 12, 2023

Related U.S. Application Data

(63) Continuation of application No. PCT/CN2021/139045, filed on Dec. 17, 2021.

(30) Foreign Application Priority Data

Dec. 17, 2020 (CN) .......................... 202011495540.3
Apr. 1, 2021 (CN) .......................... 202110358435.3

(51) Int. Cl.
G06F 3/14 (2006.01)
H04L 65/403 (2022.01)

(52) U.S. Cl.
CPC .......... G06F 3/1454 (2013.01); H04L 65/403 (2013.01)

(58) Field of Classification Search
CPC .............................. G06F 3/1454; H04L 65/403
See application file for complete search history.

(56) References Cited

U.S. PATENT DOCUMENTS

| | | | |
|---|---|---|---|
| 10,129,306 B1 * | 11/2018 | Nagy | H04L 65/403 |
| 10,454,981 B2 * | 10/2019 | Nagy | H04L 51/10 |
| 10,893,092 B2 * | 1/2021 | Jeong | G06F 3/1454 |
| 11,243,736 B2 * | 2/2022 | Kwahk | H04N 21/482 |
| 11,461,278 B2 * | 10/2022 | Nelbach, Jr. | G06F 16/176 |
| 2012/0274588 A1 | 11/2012 | Bamba | |
| 2015/0029075 A1 | 1/2015 | Xiao | |
| 2015/0106730 A1 | 4/2015 | Wang et al. | |
| 2015/0169129 A1 | 6/2015 | Park et al. | |
| 2016/0073052 A1 | 3/2016 | Wang et al. | |
| 2017/0147278 A1 * | 5/2017 | Kwahk | H04N 21/4788 |
| 2018/0131731 A1 | 5/2018 | Jones et al. | |

FOREIGN PATENT DOCUMENTS

| | | |
|---|---|---|
| CN | 102883135 A | 1/2013 |
| CN | 103873578 A | 6/2014 |
| CN | 104020968 A | 9/2014 |
| CN | 20160011158 A | 1/2016 |
| CN | 106371608 A | 2/2017 |
| CN | 109857355 A | 6/2019 |
| CN | 110798652 A | 2/2020 |
| WO | 2015054604 A1 | 4/2015 |

\* cited by examiner

*Primary Examiner* — Gene W Lee
(74) *Attorney, Agent, or Firm* — Conley Rose, P.C.

(57) ABSTRACT

A method for displaying conference shared screen content comprises obtaining first shared screen content and second shared screen content in the conference; displaying the first shared screen content and the second shared screen content; obtaining first operation data associated with the first shared screen content; and displaying a first operation on the first shared screen content based on the first operation data.

19 Claims, 10 Drawing Sheets

METHOD FOR DISPLAYING CONFERENCE SHARED SCREEN CONTENT, APPARATUS, AND SYSTEM

CROSS-REFERENCE TO RELATED APPLICATIONS

This application is a continuation application of International Patent Application No. PCT/CN2021/139045, filed on Dec. 17, 2021, which claims priority to Chinese Patent Application No. 202110358435.3, filed on Apr. 1, 2021, and Chinese Patent Application No. 202011495540.3, filed on Dec. 17, 2020. All of the aforementioned priority patent applications are hereby incorporated by reference in their entireties.

TECHNICAL FIELD

This application relates to the field of conferences, and in particular, to a method for displaying conference shared screen content, an apparatus, and a system.

BACKGROUND

A remote conference generally refers to a conference in which two or more individuals or groups in different areas transmit information such as a voice, an image, and data to each other through a conference terminal and a transmission network, to implement instant and interactive communication. Through the remote conference, people can hear voices and view images of each other during remote communication, and further share specific data content. This enhances a sense of reality, intimateness, and in-person experience of communication. The remote conference may be used in fields such as military, politics, economics, education, and health, giving full play to advantages of being real, efficient, and real-time. The remote conference provides convenient and effective means of communication, management, and collaborative decision-making.

In the remote conference, participants often need to implement in-depth and efficient communication through remote collaboration.

The remote collaboration generally means that a plurality of parties participating in a conference may perform a collaborative operation on a shared screen. For example, it is assumed that three participants respectively access a conference through respective conference terminals (also referred to as "terminals"), and a first terminal provides a piece of shared screen content. In this case, any one of the three terminals may perform the collaborative operation such as marking (for example, drawing a line or inserting content) on the shared screen content, and the three terminals can view a collaborative operating status of all terminals on the shared screen content in real time.

In an existing remote collaboration scheme, only one channel of collaboration is supported. For example, only one channel of remote collaboration based on the shared screen content may be provided, and multi-channel collaboration is not supported.

SUMMARY

This application provides a method for displaying conference shared screen content, an apparatus, and a system, to help implement multi-channel remote collaboration in a conference process. This provides better content sharing and remote collaboration experience.

To achieve the foregoing objective, this application provides the following technical solutions.

According to a first aspect, this application provides a method for displaying conference shared screen content, where the method is applied to a first terminal, the first terminal and a second terminal participate in a same conference, and the method includes obtaining first shared screen content and second shared screen content in the conference; displaying the first shared screen content and the second shared screen content; obtaining first operation data associated with the first shared screen content; and displaying a first operation on the first shared screen content based on the first operation data.

According to the first aspect of this application, multi-channel remote collaboration may be implemented in a conference process, for example, multi-channel shared screen content of the conference is displayed, and an operation is performed based on the multi-channel shared screen content, so that improved content sharing and remote collaboration experience may be provided.

In a possible implementation, obtaining the first shared screen content and second shared screen content in the conference may include obtaining a first shared screen content of a local conference site; and receiving second shared screen content from a second terminal. In this case, the method may further include: sending the first shared screen content, to enable the second terminal to display the foregoing two channels of shared screen content.

In a possible implementation, obtaining the first shared screen content and second shared screen content in the conference may include obtaining the first shared screen content and the second shared screen content of a local conference site, where the first shared screen content may be screen content of the first terminal, or may be screen content of another device at the local conference site. In this case, the method further includes: sending the first shared screen content and the second shared screen content, to enable the second terminal to display the foregoing two channels of shared screen content.

In a possible implementation, displaying the first shared screen content and the second shared screen content may include displaying the first shared screen content and the second shared screen content in an up-down or left-right side by side manner. In addition, the first terminal may further display only one piece of the first shared screen content or the second shared screen content based on a selection of a user. In this case, the first terminal may negotiate with the MCU or the second terminal to accept only screen content that needs to be displayed.

In a possible implementation, the foregoing first operation data includes first location information, the first location information is used to describe location information of the first operation on the first shared screen content, and the first operation data is generated when the first operation is performed on the first shared screen content.

Based on the foregoing possible implementation, displaying the first operation on the first shared screen content based on the first operation data may include determining second location information based on the first location information, display area information of the first shared screen content on the first terminal, and a resolution of the first shared screen content, where the second location information is display location information of the first operation on the first terminal; and then displaying the first operation based on the second location information.

Based on the foregoing possible implementation, obtaining the first operation data associated with the first shared screen content may include detecting a first operation of the local conference site, and determining the location information of the first operation on the first terminal; and determining the foregoing first location information based on the location information of the first operation on the first terminal, display area information of the first shared screen content, display area information of the second shared screen content, and a resolution of the first shared screen content.

Based on the foregoing possible implementation, obtaining the first operation data associated with the first shared screen content may include detecting a second operation of the local conference site, and determining location information of the second operation on the first terminal; then determining the location information of the first operation on the first terminal and location information of a third operation on the first terminal based on the location information of the second operation on the first terminal, display area information of the first shared screen content, and display area information of the second shared screen content, where the first operation and the third operation are respectively parts that occur on the first shared screen content and the second shared screen content in the second operation; and then determining the foregoing first location information based on the location information of the first operation on the first terminal, the display area information of the first shared screen content, and a resolution of the first shared screen content.

In the foregoing possible implementation, the location information of the first operation on the first terminal may be coordinate information of the first operation on a display screen of the first terminal. Correspondingly, the foregoing first location information is coordinate information of the first operation on the first shared screen content.

Based on the foregoing possible implementation, the foregoing method may further include sending the foregoing first operation data, where the first collaborative operation data includes a media stream identifier of the first collaborative operation data, to enable the second terminal to display a first collaborative operation on the first shared screen content based on the first collaborative operation data.

In a possible implementation, obtaining the first operation data associated with the first shared screen content may further include receiving second operation data from the second terminal; determining that the second operation data includes a media stream identifier of the first operation data associated with the first shared screen content; and obtaining the first operation data from the second operation data based on the media stream identifier of the first operation data.

In a possible implementation, when the first terminal sends shared screen content or operation data to the second terminal, the foregoing data may be sent to the second terminal through an MCU.

According to a second aspect, this application provides a method for displaying conference shared screen content, where the method is applied to a multipoint control unit (MCU), and the method includes receiving first shared screen content and second shared screen content; combining the first shared screen content and the second shared screen content into third shared screen content based on a first parameter; sending the third shared screen content; receiving first operation data; and determining second operation data based on the first operation data and the first parameter, and sending the second operation data.

According to the second aspect of this application, the MCU may combine multi-channel shared screen content in a conference into one channel of shared screen content based on the first parameter, and may further perform mutual conversion between operation data based on the multi-channel shared screen content and operation data based on the combined one channel of shared screen content, so that a terminal that does not support multi-channel collaborative processing in the conference may also participate in multi-channel collaboration of the conference. This improves adaptability of the method for displaying the conference shared screen content.

In a possible implementation, the first parameter may include a resolution of the third shared screen content, display area information of the first shared screen content on the third shared screen content, and display area information of the second shared screen content on the third shared screen content. In addition, the first parameter may be a parameter preset in a system, or may be obtained by the MCU through negotiation with the terminal.

In a possible implementation, the first operation data includes first location information, and the first location information is location information of a first operation on the first shared screen content; the second collaborative operation data includes second location information, and the second location information is location information of the first operation on the third shared screen content; in this case, the determining second operation data based on the first operation data and the first parameter may include determining the second location information based on the first location information, display area information of the first shared screen content on the third shared screen content, and a resolution of the first shared screen content.

In a possible implementation, the first operation data includes first location information, and the first location information is location information of a first operation on third shared screen content; the second operation data includes second location information, and the second location information is location information of a second operation on the first shared screen content; the second operation is a part or all of the first operation; in this case, the determining second operation data based on the first operation data and the first parameter may include determining location information of the second operation on the third shared screen content based on the first location information and display area information of the first shared screen content on the third shared screen content; and then determining the second location information based on the location information of the second operation on the third shared screen content, the display area information of the first shared screen content on the third shared screen content, and a resolution of the first shared screen content.

In the foregoing two possible implementations, the location information may be coordinates. For example, the location information of the first operation on the first shared screen content may be coordinates of the first operation on the first shared screen content.

According to a third aspect, this application further provides a terminal. It is assumed that the terminal is a first terminal, and the first terminal and a second terminal participate in a same conference. The first terminal includes an obtaining module and a display module, where the obtaining module is configured to obtain first shared screen content and second shared screen content in the conference and is further configured to obtain first collaborative operation data associated with the first shared screen content; and the display module is configured to display the first shared screen content and the second shared screen content; and is further configured to display a first collaborative operation on the first shared screen content based on the first collaborative operation data.

When obtaining the first shared screen content and the second shared screen content, the obtaining module may obtain the first shared screen content of a local conference site, and receive the second shared screen content from the second terminal. In this case, the first terminal may further include a sending module, configured to send the first shared screen content, to enable the second terminal to display the first shared screen content and the second shared screen content.

When obtaining the first shared screen content and the second shared screen content, the obtaining module may further obtain the first shared screen content and the second shared screen content of the local conference site. In this case, the first terminal may further include the sending module, configured to send the two channels of shared screen content, to enable the second terminal to display the two channels of shared screen content.

When displaying the two channels of shared screen content, the display module may display the two channels of shared screen content in an up-down or a left-right side by side manner, or display one of the two channels of shared screen content.

Optionally, the terminal may further include a determining module; the first collaborative operation data includes location information of the first collaborative operation on the first shared screen content, and a process in which the obtaining module obtains first collaborative operation data associated with the first shared screen content may be: when an operation at the local conference site is detected, indicating the determining module to determine location information of the operation on the first terminal, determining, based on the location information and display area information of the two channels of shared screen content, that the operation includes a first collaborative operation, and determining location information of the first collaborative operation on the first terminal; and then determining the location information of the first collaborative operation on the first shared screen content based on the location information of the first collaborative operation on the first terminal, a display area information of the first shared screen content, and a resolution of the first shared screen content. In this case, the sending module may further send the first collaborative operation data, so that the second terminal may also display the first collaborative operation on the first shared screen content.

In the foregoing two possible implementations, the location information may be coordinates. For example, the location information of the first operation on the first shared screen content may be coordinates of the first operation on the first shared screen content.

According to a fourth aspect, this application further provides a terminal, where the terminal includes a memory and one or more processors; the memory is coupled to the processor; the memory is configured to store computer program code, and the computer program code includes computer instructions; and when the computer instructions are executed by the terminal, the terminal is enabled to perform the method for displaying conference shared screen content according to any possible implementation provided in the first aspect.

According to a fifth aspect, this application further provides an MCU, where the MCU includes a receiving module, a processing module, and a sending module, where the receiving module is configured to receive first shared screen content and second shared screen content and is further configured to receive first operation data; the processing module is configured to combine the first shared screen content and the second shared screen content into third shared screen content based on a first parameter; and is further configured to determine second operation data based on the first operation data and the first parameter; and the sending module is configured to send the third shared screen content and the second operation data.

In a possible implementation, the first parameter may include a resolution of the third shared screen content, display area information of the first shared screen content on the third shared screen content, and display area information of the second shared screen content on the third shared screen content. It may be understood that the first parameter may be a preset parameter, or may be obtained by the MCU through negotiation with the terminal.

In a possible manner, the first operation data includes first location information, and the first location information is location information of a first collaborative operation on the first shared screen content; the second operation data includes second location information, and the second location information is location information of the first collaborative operation on the third shared screen content; in this case, that the processing module determines the second operation data based on first collaborative operation data and the first parameter may be: determining the second location information based on the first location information, display area information of the first shared screen content on the third shared screen content, and a resolution of the first shared screen content.

In another possible manner, the first operation data includes first location information, and the first location information is location information of a first operation on third shared screen content; the second operation data includes second location information, and the second location information is location information of a second operation on the first shared screen content; the second operation is a part or all of the first operation; in this case, that the processing module determines the second operation data based on the first operation data and the first parameter, includes: determining location information of the second operation on the third shared screen content based on the first location information and display area information of the first shared screen content on the third shared screen content; and then determining the second location information based on location information of the second collaborative operation on the third shared screen content, the display area information of the first shared screen content on the third shared screen content, and a resolution of the first shared screen content.

In the foregoing two possible implementations, the location information may be coordinates. For example, the location information of the first operation on the first shared screen content may be coordinates of the first operation on the first shared screen content.

According to a sixth aspect, this application provides an MCU, where the MCU includes a memory, one or more processors, and a transceiver; the memory is coupled to the processor; the memory is configured to store computer program code, and the computer program code includes computer instructions; and when the computer instructions are executed by the terminal, the terminal is enabled to perform the method for displaying conference shared screen content according to any possible implementation provided in the second aspect.

According to a seventh aspect, this application provides a computer-readable storage medium, where the computer-readable storage medium stores a computer program; and when the computer program is executed on a computer, the computer is enabled to perform the method for displaying conference shared screen content according to any possible implementation provided in the first aspect or the second aspect.

According to an eighth aspect, this application provides a computer program product, where the computer program product includes computer-executable instructions; and when the computer-executable instructions are executed on a computer, the computer is enabled to perform the method for displaying conference shared screen content according to any possible implementation provided in the first aspect or the second aspect.

For detailed descriptions of the second aspect to the eighth aspect and the implementations of the second aspect to the eighth aspect in this application, refer to the descriptions of the first aspect, the second aspect, and the implementations of the first aspect and the second aspect. In addition, for beneficial effects of the second aspect to the eighth aspect and the implementations of the second aspect to the eighth aspect, refer to beneficial effect analysis of the first aspect, the second aspect, and the implementations of the first aspect and the second aspect. Details are not described herein again.

DESCRIPTION OF EMBODIMENTS

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

For ease of understanding, before the technical solutions provided in embodiments of this application are described, the following describes key terms in this application.

A remote conference generally includes two or more participants located in different places, where each participant accesses the conference through a conference terminal (also referred to as "terminal") at a local conference site, and a quantity of users actually participating in the conference at the conference site of each participant may be one or more.

In a process of remote collaboration in the remote conference, content viewed by each terminal, for example, collaboration content, includes the following two parts.

Content of a first part: background content based on which a plurality of terminals performs collaborative operations, for example, "shared screen content".

Content of a second part: data generated when the plurality of terminals marks the content of the first part (for example, the shared screen content) in a collaborative operation (for example, a "collaborative operation" or an "operation") process, for example, "collaborative operation data" or "operation data". For example, drawing a line, drawing a rectangle, or drawing an ellipse on the content of the first part, or inserting operation data generated by a text, a graph, a table, or audio and video content on the content of the first part.

Figure 1A:
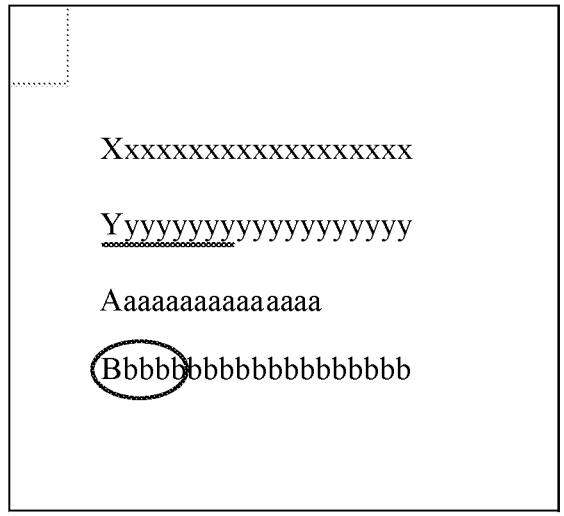
FIG. 1A and FIG. 1B are schematic diagrams of collaboration content displayed in remote collaboration.
Figure 1B:
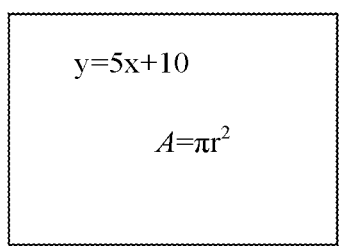

For example, in the example of remote collaboration shown in FIG. 1A, the content of the first part, for example, the shared screen content, is an opened document, and the content of the second part includes a red line segment and a blue ellipse that are drawn when the document is marked. In the example shown in FIG. 1B, the content of the first part is a blank screen, for example, an electronic whiteboard, and the content of the second part includes a formula written on the electronic whiteboard and an inserted formula.

The following describes implementation principles, implementations, and beneficial effects of the technical solutions of this application with reference to the accompanying drawings.

This application provides a method for displaying conference shared screen content that is implemented in the remote conference, to help implement multi-channel remote collaboration, where multi-channel shared screen content in the multi-channel remote collaboration may be provided by a same terminal, or may be provided by different terminals.

Figure 2:
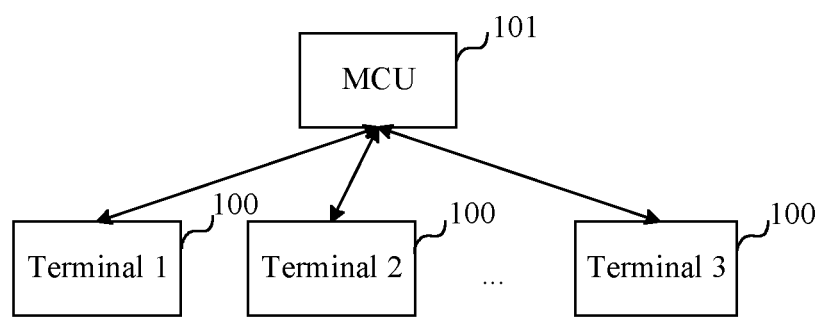
FIG. 2 is a schematic diagram of an architecture of a conference system to which an embodiment of this application is applicable.

For example, FIG. 2 is a schematic diagram of an architecture of a conference system to which a method for displaying conference shared screen content is applicable according to this application. The conference system is formed by a MCU 101 and a plurality of terminals 100 (for example, a terminal 1, a terminal 2, and a terminal 3 in FIG. 2). Each terminal may establish a communication connection to the MCU through a predetermined communication protocol, where a physical transmission channel on which the communication connection is based may be a manner such as an optical fiber, a cable, a microwave, or a satellite.

The terminal 100 is configured to obtain multi-channel shared screen content in a conference, and display the plurality of pieces of shared screen content to a user based on a preset display mode. The foregoing multi-channel shared screen content may be provided by a terminal 100, for example, shared screen content of a local conference site that is obtained by the terminal 1, or shared screen content that is forwarded by the MCU 101 and provided by another terminal, for example, the terminal 2. When one or more channels of the foregoing multi-channel shared screen content are provided by the terminal 1, the terminal 1 may forward the provided one or more channels of multi-channel shared screen content to another terminal through the MCU 101, so that the other terminal may also display the foregoing multi-channel shared screen content based on the preset mode. The foregoing "another terminal" refers to a terminal that is located in another conference site and that participates in a same conference with the terminal 1.

In addition, the terminal 100 is further configured to obtain collaborative operation information. The collaborative operation information includes collaborative operation data for at least one channel of shared screen content in the multi-channel shared screen content, and displays a corresponding collaborative operation on corresponding shared screen content based on the collaborative operation data. The foregoing operation information may be obtained by a terminal 100, for example, the terminal 1, by detecting a collaborative operation of a participant at the local conference site, or may be collaborative operation information that is received from another conference site and that is forwarded by the MCU 101. When the foregoing collaborative operation information is generated by the participant at the conference site in which the terminal 1 is located that performs the collaborative operation, the terminal 1 is further configured to forward the collaborative operation information to the other terminal through the MCU 101, so that the other terminal may also display the corresponding collaborative operation on the corresponding shared screen content based on the collaborative operation information.

Optionally, the terminal 100 is further configured to collect video, audio, and control information (for example, applying for a "floor" and applying for a main control right) of the local conference site, and send the information to the MCU 101, so that the MCU 101 forwards the information. Therefore, the other terminal may receive the video, audio, and control information of the conference site; and is further configured to receive the video, audio, and control information that is forwarded by the MCU 101 and collected from the other terminal.

The MCU 101 is configured to forward conference data, where the conference data includes the one or more channels of shared screen content and the collaborative operation information. For example, the MCU 101 may be configured to receive the one or more channels of shared screen content and the collaborative operation information that are sent by a terminal, and forward the one or more channels of shared screen content and the collaborative operation information to the other terminal, so that each terminal participating in the conference may display the multi-channel shared screen content and a corresponding collaborative operation. It should be understood that the foregoing conference data may further include the video, audio, and control information in the conference.

In some implementations, a terminal participating in the conference may not support multi-channel remote collaboration, for example, does not support display and collaborative operation processing of the multi-channel shared screen content. In this case, the MCU 101 may be further configured to combine the multi-channel shared screen content in the conference into one channel of shared screen content based on a first parameter and send the one channel of shared screen content to the terminal. In addition, the collaborative operation information for the plurality of pieces of shared screen content is converted based on the first parameter and then sent to the terminal, so that the terminal may also display the multi-channel shared screen content, and may correctly display a corresponding collaborative operation.

It should be noted that a quantity of MCUs 101 and a quantity of terminals 100 shown in FIG. 2 do not limit a conference system to which this application is applicable. For example, there may be only two terminals. For another example, there may be a plurality of MCUs 101. In this implementation, each MCU 101 may be connected to a plurality of terminals 100 or other MCUs 101, so that a large conference scale may be supported (in an example, more participants may be supported). In this case, the MCU 101 may be configured to receive conference data sent by a terminal 100 or an MCU 101 connected to the MCU 101, and forward the conference data to another terminal 100 or MCU 101 connected to the MCU 101. This is not described herein again.

Figure 3:
FIG. 3 is a schematic diagram of an architecture of another conference system to which an embodiment of this application is applicable.

It should be further noted that when there are only two terminals participating in the conference, the conference system may alternatively not need the MCU 101 to forward the conference data, and the terminal 100 may directly send conference data of the local conference site to the other terminal 100; or may directly receive the conference data from another conference site sent by the other terminal 100. In this implementation, an architecture of a conference system to which this application is applicable may be shown in FIG. 3.

With reference to FIG. 4A and FIG. 4B to FIG. 8, the following describes a method for displaying conference shared screen content provided in this application. In this embodiment, a description is made by using an example of the architecture of the conference system shown in FIG. 2. In this embodiment, it is assumed that a conference includes two conference sites, and the two conference sites respectively access the conference through a terminal 1 and a terminal 2.

Figure 4A:
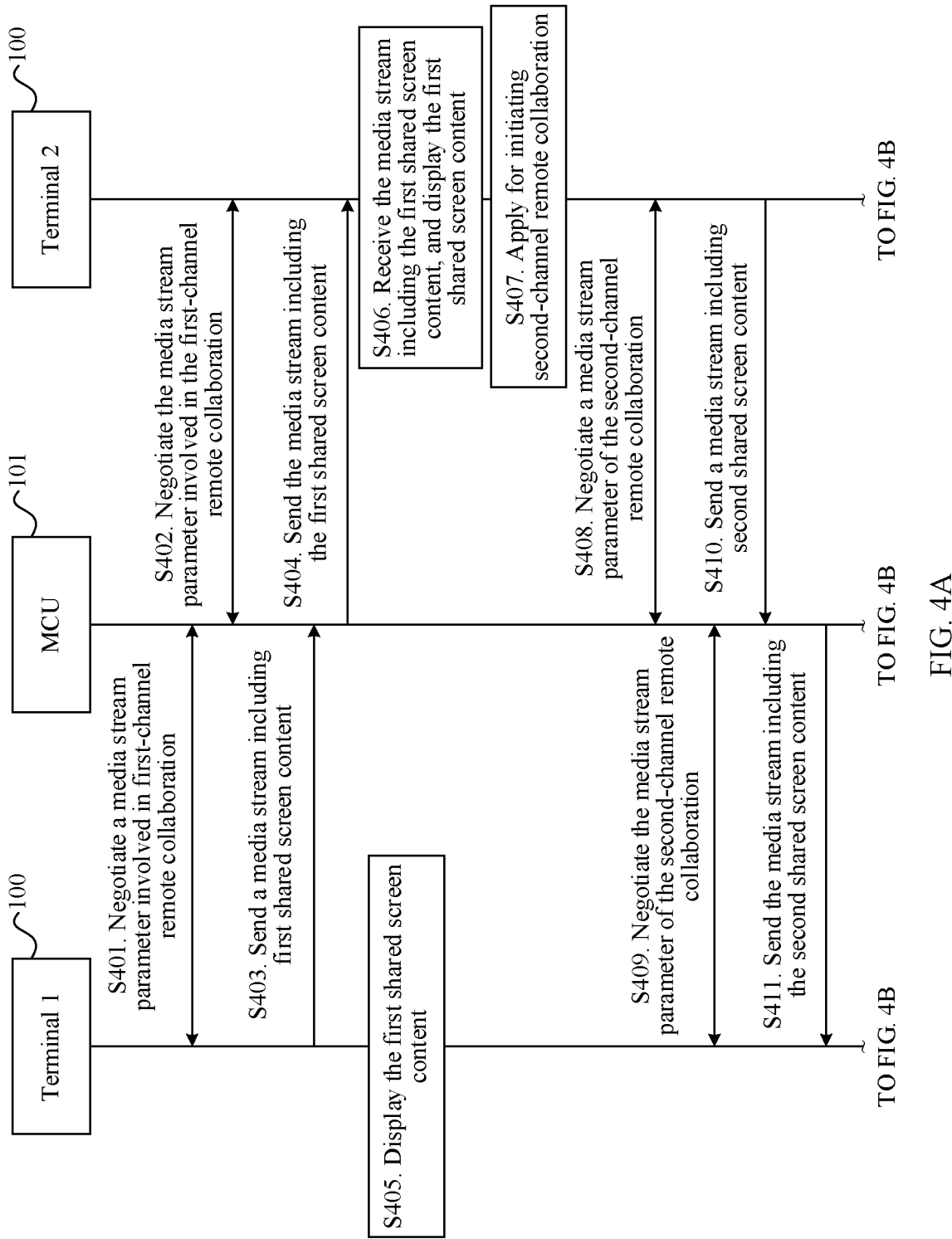
FIG. 4A and FIG. 4B are flowcharts of a method for displaying conference shared screen content according to an embodiment of this application.
Figure 4B:
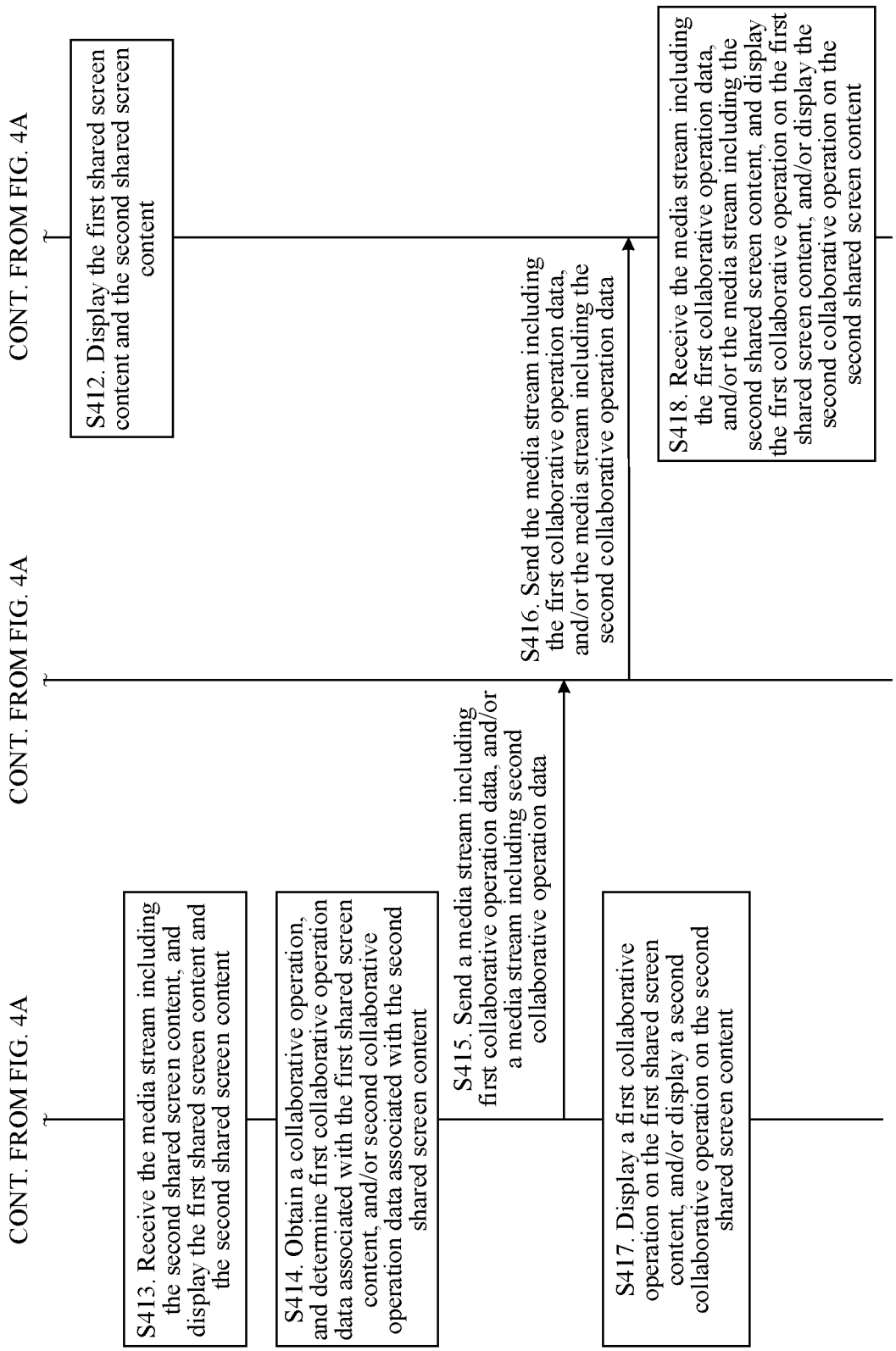

FIG. 4A and FIG. 4B are schematic flowcharts of a method for displaying conference shared screen content according to this application. In this embodiment, it is assumed that two conference sites respectively access a same conference through a terminal 1 and a terminal 2. In the conference, first, the terminal 1 initiates first-channel remote collaboration (the terminal 1 provides first-channel shared screen content of the conference), and then the terminal 2 initiates second-channel remote collaboration (the terminal 2 provides second-channel shared screen content of the conference); and then the terminal 1 and the terminal 2 may perform a collaborative operation based on the first-channel shared screen content and the second-channel shared screen content. The method includes but is not limited to the following steps.

S401. A terminal 1 negotiates a media stream parameter involved in first-channel remote collaboration with an MCU.

When the terminal 1 initiates a first-channel remote collaboration request, the terminal 1 negotiates the media stream parameter involved in the first-channel remote collaboration with the MCU. The media stream parameter negotiated by the two may include a media stream identifier involved in the first-channel remote collaboration and, in an example, may include a media stream identifier used to identify the first shared screen content that needs to be shared by the terminal 1 and a media stream identifier used to identify operation data of the first shared screen content.

The media stream identifier may be any form of content that is generated by the terminal 1 or the MCU according to a predetermined rule and that includes a digit or a character. This is not limited in this application.

Because this embodiment involves multi-channel remote collaboration, to enable a terminal to distinguish media streams involved in the multi-channel remote collaboration and correctly display the media streams, the media streams in the multi-channel remote collaboration need to be identified. Using the first-channel remote collaboration as an example, the first-channel remote collaboration involves two media streams such as a first media stream is shared screen content of the first-channel remote collaboration (for example, background content based on which an operation in the first-channel remote collaboration is performed, which is referred to as "first shared screen content" below for ease of description); and a second media stream is operation data of the first-channel remote collaboration (referred to as "first collaborative operation data" below). It may be understood that first collaborative operation data is operation data that occurs on the first shared screen content.

The terminal 1 and the MCU may transmit the media stream involved in the first-channel remote collaboration through an existing transmission channel between the terminal 1 and the MCU, or through a newly established transmission channel. In an example, if the terminal 1 and the MCU want to perform transmission through the newly established transmission channel, in this step, the terminal 1 and the MCU may further negotiate an address (for example, an IP address and a port number) of one or two transmission channels used for media stream content involved in the first-channel remote collaboration. Then, the terminal 1 and the MCU may establish, based on the negotiated address, one or two transmission channels for subsequently transmitting the media stream content involved in the first-channel remote collaboration.

Optionally, when the terminal 1 and the MCU respectively transmit the first shared screen content and the first collaborative operation data by using two transmission channels, the terminal 1 and the MCU may use the address of the transmission channel as the media stream identifier. In this implementation, the terminal 1 and the MCU may directly distinguish different media streams through addresses of different transmission channels, and do not need to encapsulate the identifier in a corresponding media stream for transmission.

Optionally, the media stream parameter negotiated by the terminal 1 and the MCU may further include other content, for example, a resolution of the first shared screen content sent between the terminal 1 and the MCU, or a manner of processing the first shared screen content or the first collaborative operation data, for example, whether to compress the first shared screen content or the first collaborative operation data, and if the first shared screen content or the first collaborative operation data needs to be compressed, what compression algorithm, specific compression parameter, or transmission protocol is used to send the first shared screen content or the first collaborative operation data.

In the foregoing process, the terminal 1 and the MCU may perform negotiation based on a T.120 control protocol or another protocol. This is not limited in this application. The foregoing media stream parameter may be negotiated between the terminal 1 and the MCU through the transmission channel established between the terminal 1 and the MCU, or the foregoing media stream parameter may be negotiated between the terminal 1 and the MCU through a channel newly established between the terminal 1 and the MCU. Optionally, in some implementations, the terminal and the MCU may further predefine, before the conference, media stream identifiers involved in the multi-channel remote collaboration. In this case, the terminal 1 and the MCU may directly determine the media stream identifier of the first shared screen content and the media stream identifier of the first collaborative operation data according to a predefined rule. In this implementation, the terminal 1 and the MCU may not need to perform a negotiation process of the foregoing media stream identifier.

S402. The MCU negotiates the media stream parameter of the first-channel remote collaboration with a terminal 2.

The MCU may perform this step after performing S401, or may perform this step when receiving the first-channel remote collaboration request initiated by the terminal 1.

The process is similar to a process in which the terminal 1 negotiates the media stream parameter of the first-channel remote collaboration with the MCU in S401, and is not described again. It may be understood that the media stream identifier negotiated between the MCU and the terminal 2 may not be consistent with the media stream identifier negotiated between the terminal 1 and the MCU in S401. In this case, the MCU may maintain a correspondence between media stream identifiers negotiated between the two terminals, and perform corresponding forwarding based on the correspondence.

Optionally, in this step, the MCU may also directly send the media stream parameter of the first-channel remote collaboration determined by negotiating with the terminal 1 in S401 to the terminal 2, so that the terminal 2 may correctly identify and process the media stream content of the first-channel remote collaboration.

Similarly, as described in step S401, the MCU may also negotiate one or two new transmission channels for transmitting the media stream content of the first-channel remote collaboration with the terminal 2. This is not described herein again.

S403. The terminal 1 sends a media stream including first shared screen content to the MCU.

After performing S401, the terminal 1 sends the media stream including the first shared screen content to the MCU.

The terminal 1 may perform processing on the obtained first shared screen content based on the media stream parameter negotiated in 401, for example, perform processing such as compression and encapsulation based on the negotiated parameter, and then send the processed first shared screen content to the MCU.

It should be noted that when the terminal 1 sends the media stream including the first shared screen content to the MCU, the media stream identifier may be carried. In an example, if the media stream is not transmitted between the terminal 1 and the MCU through an independent transmission channel, the terminal 1 may encapsulate the media stream identifier into the media stream. For example, if the terminal 1 and the MCU transmit the first shared screen content by using a Real-time Transport Protocol (RTP), the media stream identifier of the first shared screen content may be carried in a payload type field in an RTP header, or carried in an extension header of the RTP. The terminal 1 and the MCU may also transmit the first shared screen content in another customized manner and include the media stream identifier of the first shared screen content. This is not limited in this application. In addition, if the terminal 1 and the MCU transmit the media stream through an independent transmission channel, the media stream may be directly identified through an address of the transmission channel. It may be considered that the address of the transmission channel is the media stream identifier.

The first shared screen content may be screen content of the terminal 1, or may be screen content of another device at a conference site in which the terminal 1 is located. When the first shared screen content is not the screen content of the terminal 1, before performing this step, the terminal 1 may first obtain first shared screen content of a local conference site, for example, obtain screen content of a computer at the conference site through a High-Definition Multimedia Interface (HDMI), or obtain screen content of a mobile phone in a wireless transmission manner.

In this step, the terminal 1 may send the first shared screen content to the MCU in real time. It may be understood that in a process of the first-channel remote collaboration, the terminal 1 may continuously obtain a picture of the first shared screen content based on a specific frequency and send the picture of the first shared screen content to the MCU in real time, where the specific frequency may be a predefined value, for example, 25 frames are obtained per second. Alternatively, the terminal 1 may continuously obtain the picture of the first shared screen content based on the specific frequency, and when detecting that the picture of the first shared screen content changes, send the picture to the MCU.

S404. The MCU forwards the media stream including the first shared screen content to the terminal 2.

Optionally, the MCU may further locally cache the received first shared screen content for a predetermined time period. In this way, when a new terminal accesses the conference, the MCU may directly send the locally cached first shared screen content to the new terminal, so that the new terminal may also participate in the first-channel remote collaboration in real time.

S405. The terminal 1 displays the first shared screen content.

After obtaining the first shared screen content, the terminal 1 may first display the first shared screen content, and then send the first shared screen content to the MCU. Alternatively, the terminal 1 may first send the first shared screen content to the MCU, and then display the first shared screen content. In an example, S403 and S405 are performed without considering a sequence.

S406. The terminal 2 receives the media stream including the first shared screen content, and displays the first shared screen content.

The terminal 2 receives the first shared screen content sent by the MCU, and displays the first shared screen content on a screen.

In this case, participants in conference sites in which the terminal 1 and the terminal 2 are located may all view the first shared screen content, and start the first-channel remote collaboration. For example, the participants in the two conference sites may mark (including drawing a line, inserting content, and the like) the first shared screen content. Operation data generated when a collaborative operation is performed in each conference site may also be obtained by a terminal at the local conference site in real time and then sent to a terminal in the other conference site, so that the participant may view collaborative operations generated by all conference sites in real time. In this embodiment, a process of processing and sending the operation data is described in S414 to S418.

S407. The terminal 2 applies for initiating second-channel remote collaboration.

It is assumed that in a conference process, the terminal 2 wants to simultaneously initiate the second-channel remote collaboration, and the terminal 2 may apply to a host terminal 1 for initiating the second-channel remote collaboration.

Figure 5:
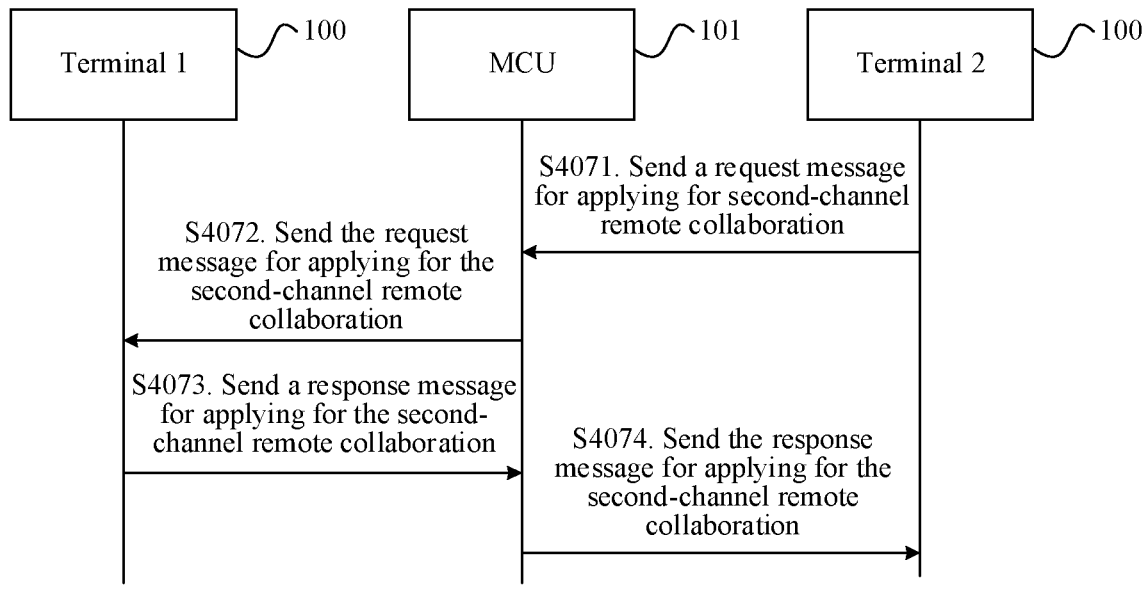
FIG. 5 is a schematic flowchart for initiating second-channel remote collaboration according to an embodiment of this application.
Figure 6:
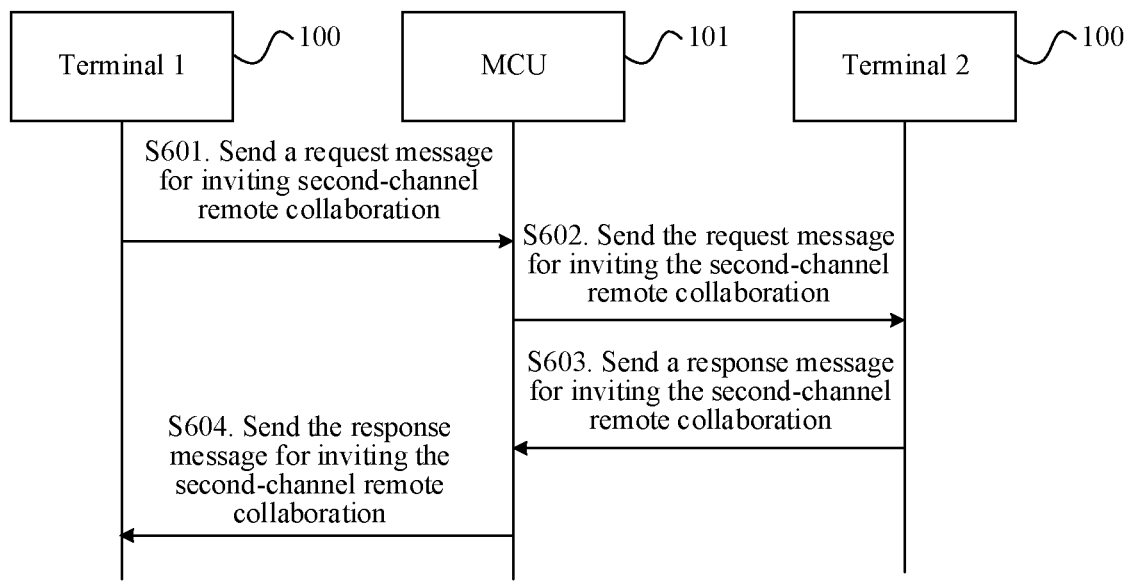
FIG. 6 is a schematic flowchart for initiating second-channel remote collaboration according to an embodiment of this application.
Figure 7A:
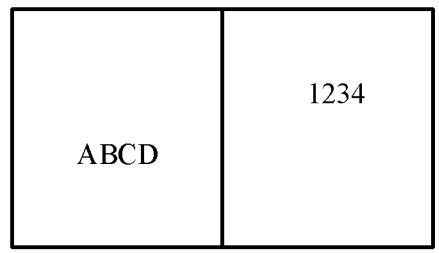
FIG. 7A to FIG. 7E are schematic diagrams of displaying two channels of shared screen content according to an embodiment of this application.
Figure 7B:
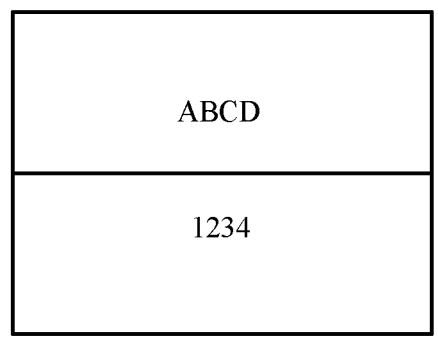
Figure 7C:
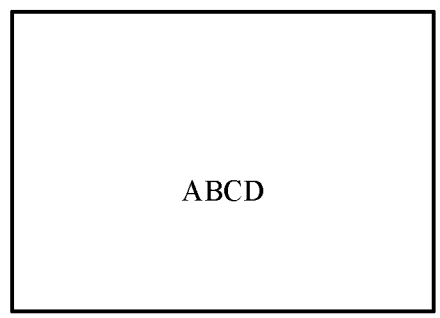
Figure 7D:
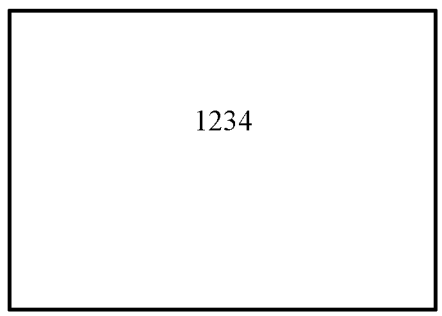
Figure 7E:
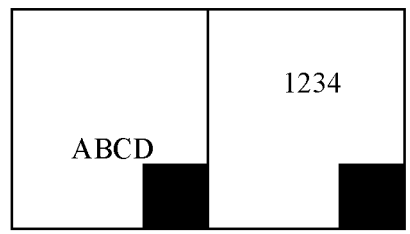

As shown in S4071 and S4072 in FIG. 5, the terminal 2 may send, to the terminal 1 through the MCU, a request message for applying for the first-channel remote collaboration, where the request message may carry an identifier of a conference site in which the terminal 2 is located, for example, a name of the conference site.

Correspondingly, as shown in S4073 and S4074 in FIG. 5, the terminal 1 sends, to the terminal 2 through the MCU, a response message for applying for the second-channel remote collaboration, where the response message may carry result indication information of the request. For example, if a host agrees with the request sent by the terminal 2, the returned response message may carry indication information indicating that the request succeeds; otherwise, the returned response message carries indication information indicating that the request fails.

In an implementation, the foregoing request or response message may be implemented by extending an existing protocol. For example, the foregoing request or response message may be implemented based on a T.120, H.323, or Session Initiation Protocol (SIP).

If the foregoing request message or response message is implemented based on the SIP protocol, the foregoing request message or response message may be implemented by extending an info message in the SIP protocol, and may be implemented in an Extensible Markup Language (XML) format.

For example, the foregoing request message may be implemented in the following form (for example, implemented in a form of a token request message). When sending the request message, the terminal 2 may fill in an identifier of a conference site in which the terminal 2 is located in a "reqsitenum" field, for example, a name of the conference site.

```
<?xml version="1.0" encoding="UTF-8"?>
<schema xmlns="http://www.huawei.com/media-control" version="1.0">
<element name="reqsitenum" type="string"/>
<!-->Collaboration token request</-->
<complexType name="collaboration_token_req">
   <sequence>
      <element ref="reqsitenum" type="string"/>
   </sequence>
</complexType>
</schema>
```

For another example, the foregoing response message may be in the following form. When sending the response message, the terminal 1 may fill in indication information of a request result in a "reqresult" field. For example, 0 represents "request fails", and 1 represents "request succeeds".

```
<?xml version="1.0" encoding="UTF-8"?>
<schema xmlns="http://www.huawei.com/media-control" version="1.0">
<element name="reqresult" type="string"/>
<!--> Response to a collaboration token request</-->
<complexType name="collaboration_token_Ack">
   <sequence>
      <element ref="reqsitenum" type="string"/>
      <element ref="reqresult" type="string"/>
   </sequence>
</complexType>
</schema>
```

Optionally, in the foregoing process, the MCU may record the foregoing request message and corresponding response result information, to determine, based on the recorded information in a subsequent step, whether the terminal 2 has a permission to initiate the second-channel remote collaboration.

S408. The terminal 2 negotiates a media stream parameter of the second-channel remote collaboration with the MCU.

Similar to the description in S401, the media stream parameter negotiated between the terminal 2 and the MCU may include an identifier of media stream content of the second-channel remote collaboration. Similarly, the media stream content of the second-channel remote collaboration also includes two channels of sub-media streams such as one channel of sub-media stream is shared screen content (for example, background content of a second-channel remote collaborative operation, referred to as "second shared screen content" below) in the second-channel remote collaboration; and the other channel of sub-media stream is operation data of the second-channel remote collaboration (referred to as "second collaborative operation data" below).

For other media stream parameters negotiated between the terminal 2 and the MCU, or other content negotiated between the terminal 2 and the MCU, and a specific implementation, refer to the description in S401, and details are not described herein again.

Optionally, before performing the foregoing negotiation with the terminal 2, the MCU may further determine, based on a request message about applying for the second-channel remote collaboration and corresponding response result information that are recorded in S407, whether the terminal 2 has the permission to initiate the second-channel remote collaboration. In an example, if the MCU determines that an identifier of the conference site in the foregoing request message is consistent with the identifier of the conference site in which the terminal 2 is located, and a corresponding response message indicates that a request result is "request succeeds", it is determined that the terminal 2 has the permission to initiate the second-channel remote collaboration; otherwise, it is determined that the terminal 2 does not have the permission to initiate the second-channel remote collaboration. If the MCU determines that the terminal 2 does not have the permission to initiate the second-channel remote collaboration, the MCU may refuse to perform a process of negotiating the media stream parameter of the second-channel remote collaboration with the terminal 2. Correspondingly, S409 and subsequent steps are not performed. On the contrary, if the MCU determines that the terminal has the permission to initiate the second-channel remote collaboration, S409 and subsequent steps continue to be performed.

S409. The MCU negotiates the media stream parameter of the second-channel remote collaboration with the terminal 1.

The process is similar to a process in which the MCU negotiates the media stream parameter of the first-channel remote collaboration with the terminal 2 in S402, and details are not described herein again.

S410 and S411. The terminal 2 sends a media stream including the second shared screen content to the MCU, and the MCU sends the media stream including the second shared screen content to the terminal 1.

Similar to the description in S403, the second shared screen content may be screen content of the terminal 2, or screen content of another device at the conference site in which the terminal 2 is located.

A transmission channel of the second shared screen content may be a transmission channel that multiplexes the first shared screen content or a transmission channel of other content, or may be an independent transmission channel. When the transmission channel of the second shared screen content is a multiplexed transmission channel, in an example, the second shared screen content cannot be identified through an address of the transmission channel, the terminal 2 needs to include the media stream identifier when sending the media stream of the second shared screen content, so that each terminal can distinguish and identify the first shared screen content and the second shared screen content. For an implementation and descriptions of other aspects, refer to a process in which the terminal 1 sends the first shared screen content to the terminal 2 through the MCU in S403 and S404. Details are not described again.

S412. The terminal 2 displays the first shared screen content and the second shared screen content.

There may be a plurality of display modes for the first shared screen content and the second shared screen content. For example, in a manner shown in FIG. 7A, two pictures of the first shared screen content and the second shared screen content are arranged horizontally and evenly; in a manner shown in FIG. 7B, two pictures are arranged vertically and evenly; or in a single-picture display mode shown in FIG. 7C or FIG. 7D, one of the two pictures is selected for display. It may be understood that during actual implementation, pictures of a plurality of shared screen content may alternatively be displayed in another display manner other than the foregoing example. This is not limited in this application.

Then, the terminal 2 may determine respective display area information of the first shared screen content and display area information of the second shared screen content based on a display mode of the two channels of shared screen content. The display area information includes display locations and size information of the first shared screen content and the second shared screen content on a display. In an example, content determined by the terminal 2 in the process may be shown in Table 1. Media-ID1 and Media-ID2 are the media stream identifier of the first shared screen content and the media stream identifier of the second shared screen content respectively. $[x_{1lt}, y_{1lt}]$ and $[x_{1rb}, y_{1rb}]$ are coordinates of a display area of the first shared screen content on an upper left corner and a lower right corner of the display respectively. Similarly, $[x_{2lt}, y_{2lt}]$ and $[x_{2rb}, y_{2rb}]$ are coordinates of a display area of the second shared screen content on an upper left corner and a lower right corner of the display respectively.

TABLE 1

| Media stream | Media stream identifier | Display area information |
|---|---|---|
| First shared screen content | Media-ID1 | ([$x_{1lt}$, $y_{1lt}$], [$x_{1rb}$, $y_{1rb}$]) |
| Second shared screen content | Media-ID2 | ([$x_{2lt}$, $y_{2lt}$], [$x_{2rb}$, $y_{2rb}$]) |

For example, it is assumed that in this embodiment, a resolution of a display of the terminal 2 is 1280*720, a preset display mode determined by the terminal 2 is horizontal and even distribution, and it is assumed that an interface that displays the first shared screen content and the second shared screen content is in a full-screen display state, the terminal 2 may determine that values of [$x_{1lt}$, $y_{1lt}$] and [$x_{1rb}$, $y_{1rb}$] are correspondingly [0, 0] and [639, 719], and values of [$x_{2lt}$, $y_{2lt}$], and [$x_{2rb}$, $y_{2rb}$] are correspondingly [640, 0] and [1279, 719]. It is assumed that a display coordinate system of the terminal 2 is a coordinate system with an upper left corner as an origin, a horizontal axis to the right, and a vertical axis downward (in this embodiment, it is assumed that both a display coordinate system of each terminal and a coordinate system of the shared screen content are the coordinate systems). The terminal 2 may display the first shared screen content and the second shared screen content at a correct location based on the media stream identifier shown in Table 1 and display area information corresponding to the media stream identifier. For example, in this embodiment, the first shared screen content and the second shared screen content are evenly displayed in a left area and a right area of the display.

Optionally, in a conference process, a participant at the conference site in which the terminal 2 is located may adjust the preset display mode, for example, adjust the display area of the first shared screen content or the display area of the second shared screen content (for example, perform operations such as dragging and zooming). In this case, the terminal 2 may adjust the display area information shown in Table 1 based on the operation of the participant, so that the first shared screen content and the second shared screen content can be always correctly displayed.

In addition, it may be understood that when a display mode of the terminal 2 is the single-picture display mode, only the shared screen content that is selected to be displayed may be obtained. For example, if the display mode of the terminal 2 is displaying only the second shared screen content, the terminal 2 may negotiate with the MCU, so that the MCU does not forward the first shared screen content to the terminal 2. When the display mode of the terminal 2 is switched to displaying the first shared screen content, the terminal 2 may obtain the first shared screen content from the MCU. Certainly, in this embodiment, when the display mode of the terminal 2 is displaying only the first shared screen content, the terminal 2 still needs to obtain and send the second shared screen content to the MCU, because in the scenario, the terminal 2 is a provider of the second shared screen content in the conference.

Optionally, the terminal 2 may further record an association relationship between the first shared screen content and first video content, where the first video content is video content of the conference site in which the first shared screen content is located, for example, video content of the conference site in which the terminal 1 is located, to display the first shared screen content and the first video content based on the association relationship. Similarly, the terminal 2 may further display the second shared screen content and second video content (the second video content is video content of the conference site in which the terminal 2 is located) based on an association relationship between the second shared screen content and the second video content. For example, in the example shown in FIG. 7E, the terminal 2 displays the first shared screen content and the second shared screen content in a horizontal and even distribution manner, displays the first video content on a lower right corner of the first shared screen content in a picture-in-picture form, and displays the second video content on a lower right corner of the second shared screen content. In this manner, user experience may be further improved.

Optionally, the foregoing display mode may be the preset display mode. For example, the terminal 2 may determine the preset display mode based on an instruction of the participant. For example, the terminal 2 provides a selection interface or a configuration interface of a plurality of display modes, and then determines the preset display mode based on a selection or configuration of the participant at the local conference site. Alternatively, the terminal 2 may directly select a default display mode from the plurality of display modes as the preset display mode.

In addition, the terminal 2 may further determine the preset display mode based on an instruction of the MCU. In the implementation, the MCU may send a message including the preset display mode to the terminal 2. In an example, the message including the preset display mode may be implemented by extending the T.120, H.323, or SIP protocol.

For example, if the foregoing process is implemented based on the SIP protocol, definition of the preset display mode may be added to the info message. In an example, the definition may be made based on the XML format, as follows:

```
<?xml version="1.0" encoding="UTF-8"?>
<media_control xmlns="http://www.huawei.com/media-control" version="1.0">
    <collaboration_display_mode>
        <pic_num>2</pic_num>
        <pic_mode>1</pic_mode>
        <site_id>Media-ID1</site_id>
        <site_id>Media-ID2</site_id>
    </collaboration_display_mode>
</media_control>
```

In the example, the "<pic_num>" label represents a quantity of displayed pictures. In this embodiment, the quantity of displayed pictures is 2, and therefore a value of the label is 2. The <pic_mode> label represents a display mode. The label may be predefined different values, and a display mode represented by each value. For example, the following may be preconfigured: "1" represents a display mode of horizontal and even distribution; "2" represents a display mode of vertical and even distribution; and "3" represents a single-picture display mode. That a value of the "<pic_mode>" label is 1 represents that display is performed in a horizontal and even distribution manner. There is a plurality of <site_id> labels, and the plurality of <site_id> labels define a media stream identifier corresponding to each picture in a sequence from top to bottom and from left to right.

In addition, it should be noted that similar to the description in S405, S410 and S412 are performed without considering a sequence.

S413. The terminal 1 receives the media stream including the second shared screen content, and displays the first shared screen content and the second shared screen content.

The terminal 1 receives the second shared screen content sent by the MCU, may display the first shared screen content and the second shared screen content based on a preset mode, and may further adjust display of the two channels of shared screen content based on an operation related to displayed content performed by a user at the local conference site. The process is similar to a process in which the terminal 2 displays the first shared screen content and the second shared screen content based on the preset mode in S412, and details are not described again.

However, it should be noted that a display mode determined by the terminal 1 and a display mode determined by the terminal 2 may be different. For example, a preset display mode set by the participant at the conference site in which the terminal 1 is located is displayed vertically and evenly, and a preset display mode set by the participant at the conference site in which the terminal 2 is located is displayed horizontally and evenly. In this case, each terminal may correctly record media stream identifiers of the two channels of shared screen content and display area information of each channel of shared screen content based on a display mode of each terminal, so that the first shared screen content and the second shared screen content may be correctly displayed.

S414. The terminal 1 obtains a collaborative operation, and determines first collaborative operation data associated with the first shared screen content and/or second collaborative operation data associated with the second shared screen content.

With the progress of the conference, the participant at the conference site in which the terminal 1 is located may perform the collaborative operation.

In an example, the terminal 1 may provide menu options of a plurality of collaborative operations, so that the participant performs various different types of collaborative operations. For example, a menu provided by the terminal 1 may include "pen", "frame", "insert", and the like. The menu "pen" may further include submenus such as "pencil", "fluor pen", and "laser pen", and is used by the participant to write and draw on the shared screen content through "pen" in a plurality of forms. The menu "frame" may further include submenus such as "line", "rectangle", and "ellipse", and is used by the participant to draw various graphics (such as a straight line, a rectangle, or an ellipse) on a shared screen. The menu "insert" may include "text", "picture", "video", and the like, and is used by the participant to insert content in various forms into the shared screen content. Content and forms of the menu options of the collaborative operations provided in the terminal are not limited in this application.

When the participant performs the collaborative operation, the terminal 1 may detect the collaborative operation of the participant, and determine collaborative operation data corresponding to the collaborative operation. In this embodiment, the terminal 1 displays the two channels of shared screen content. In an example, the collaborative operation generated by the participant may occur only on one piece of shared screen content. In this case, the collaborative operation data determined by the terminal 1 may include only the first collaborative operation data associated with the first shared screen content (the example shown in FIG. 8A), or include only the second collaborative operation data associated with the second shared screen content (the example shown in FIG. 8B). In addition, the collaborative operation generated by the participant may also occur on two pieces of shared screen content. In this case, the collaborative operation data determined by the terminal 1 includes the first collaborative operation data and the second collaborative operation data (the examples shown in FIG. 8C and FIG. 8D).

The first collaborative operation data includes coordinate information of the collaborative operation on the first shared screen content, for example, coordinate information of a line or a point drawn on the first shared screen content when the participant performs a collaborative operation of a "pencil" type; or coordinate information of a "text" inserted into the first shared screen content when the participant performs a collaborative operation of a "text" type. Similarly, the second collaborative operation data includes coordinate information of the collaborative operation on the second shared screen content.

In an example, the terminal 1 may determine collaborative operation data corresponding to the foregoing collaborative operation based on the following process.

First, the terminal 1 may determine coordinate information (referred to as "physical coordinate information of the collaborative operation" below) of the collaborative operation on the display of the terminal 1. The physical coordinate information of the collaborative operation may be obtained by the terminal 1 based on coordinate information of an input event such as a mouse or a touch that is generated when the participant performs the collaborative operation. It may be understood that the physical coordinate information of the foregoing collaborative operation indicates one or more pieces of coordinate information generated by the collaborative operation. For example, if the collaborative operation is line segment marking in a horizontal direction, the physical coordinate information of the collaborative operation may include physical coordinate information of one or more line segments generated by the collaborative operation, where the physical coordinate information of each line segment may be represented by using physical coordinates of a start point and physical coordinates of an end point of the line segment, or may be represented by using physical coordinates of a start point of the line segment and a length of the line segment.

Then, the terminal 1 may determine, based on the physical coordinate information of the collaborative operation, and the display area information of the first shared screen content and the display area information of the second shared screen content on the display of the terminal 1, physical coordinate information of the first collaborative operation that occurs on the first shared screen content, and/or physical coordinate information of the second collaborative operation that occurs on the second shared screen content and that is included in the collaborative operation. For example, it is assumed that a resolution of the display of the terminal 1 is 1280*720, coordinates of a display area of the first shared screen content on an upper left corner and a lower right corner are [0, 0] and [639, 719] respectively, and coordinates of a display area of the second shared screen content on an upper left corner and a lower right corner are [640, 0] and [1279, 719] respectively. In this case, for example, if the collaborative operation is the line marking shown in FIG. 8A, and coordinates of a start point and coordinates of an end point of the marked line segment are respectively [100, 680] and [530, 680], the terminal 1 may determine that the marking operation includes only the first collaborative operation, and physical coordinate information corresponding to the first collaborative operation is a line segment represented by the coordinates [100, 680] of the start point and the coordinates [530, 680] of the end point.

Figure 8A:
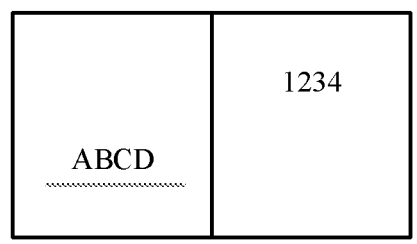
FIG. 8A to FIG. 8D are schematic diagrams of performing a collaborative operation on two channels of shared screen content according to an embodiment of this application.
Figure 8B:
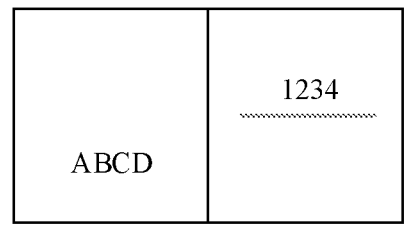
Figure 8C:
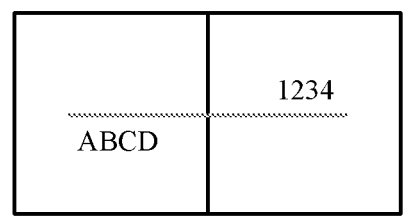
Figure 8D:
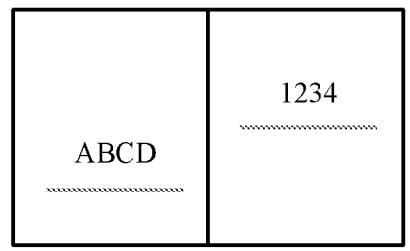

For another example, if the collaborative operation is the line marking shown in FIG. 8D, and coordinates of a start point and coordinates of an end point of the marked line segment are [160, 360] and [1120, 360] respectively, the terminal 1 may determine that the marking operation not only includes the first collaborative operation, but also includes the second collaborative operation. In addition, the physical coordinate information corresponding to the first collaborative operation is a line segment represented by the coordinates [160, 360] of the start point and coordinates [639, 360] of an end point; and the physical coordinate information corresponding to the second collaborative operation is a line segment represented by coordinates [640, 360] of a start point and coordinates [1120, 360] of an end point.

Further, the terminal 1 may determine the collaborative operation data corresponding to the collaborative operation based on the determined physical coordinate information corresponding to the first collaborative operation, and/or the determined physical coordinate information corresponding to the second collaborative operation. In the process, the physical coordinate information corresponding to the first collaborative operation needs to be converted into the coordinate information of the first collaborative operation on the first shared screen content, and/or the physical coordinate information corresponding to the second collaborative operation needs to be converted into the coordinate information of the second collaborative operation on the second shared screen content. The process may be obtained through a relationship (for example, translation and zooming) between a coordinate range of the shared screen content and a physical coordinate range of the shared screen content. The coordinate range of the shared screen content may be obtained based on a resolution of the shared screen content, and the physical coordinate range of the shared screen content may be obtained based on a display area of the shared screen content. In this embodiment, it is assumed that resolutions of the two pieces of shared screen content are both 1280*720, for example, coordinate ranges of the two pieces of shared screen content are both [0, 0] (coordinates on an upper left corner point) to [1279, 719] (coordinates on a lower right corner point). It may be learned based on the display area information of the first shared screen content that a physical coordinate range of the first shared screen content is [0, 0] to [639, 719]. In an example, for a point on the first collaborative operation, a conversion relationship between physical coordinates of the point and coordinates of the point on the first shared screen content is as follows. The coordinates of the point on the first shared screen content may be obtained by multiplying horizontal coordinates of the point in the physical coordinates by two times and keeping vertical coordinates of the point in the physical coordinates unchanged. In an example, if it is assumed that the physical coordinates of the point are [x1, y1], and the coordinates of the point on the first shared screen content are [x1', y1'], x1'=x1*2, and y1'=y1. Similarly, a point on the second collaborative operation may be obtained, and a conversion relationship between physical coordinates of the point and coordinates of the point on the second shared screen content may be obtained as follows: x2'=(x2−640)*2, and y2'=y2, where [x2, y2] is the physical coordinates of the point, and [x1', y1'] is the coordinates of the point on the second shared screen content. In an example, in the example shown in FIG. 8D, the collaborative operation data determined by the terminal 1 includes the first collaborative operation data and the second collaborative operation data, where the first collaborative operation data is a line segment from [320, 360] (a start point) to [1278, 360] (an end point), and the second collaborative operation data is a line segment from [0, 360] to [960, 360].

It may be understood that the first collaborative operation data in the foregoing collaborative operation data may further include type information of the first collaborative operation, and the type information may be determined through a menu option of the collaborative operation selected by the participant, for example, "pencil" or "text".

In addition, the foregoing first collaborative operation data may further include other parameter information of the first collaborative operation, for example, information such as a type (a solid line, a dashed line, or the like), a length, a thickness, and a color of a line in a shape such as a rectangle or a line segment generated when the participant performs a "pen" or "frame" operation; or inserted content and attribute information of the inserted content when the participant performs an "insert" operation, for example, content of an inserted text when the participant inserts the "text" operation, and attribute information such as a font, a size, and a color of the text content, or content of the "picture" or the "video" when the participant inserts the "picture" or the "video". It may be understood that when receiving the collaborative operation data from the terminal 1, the other terminal may correctly display, based on the collaborative operation data, the collaborative operation performed at the conference site of the terminal 1.

Similarly, the second collaborative operation data in the foregoing collaborative operation data may also include type information of the second collaborative operation, and other parameter information of the second collaborative operation. This is not described again.

In addition, it should be noted that during actual implementation, the terminal 1 may detect a collaborative operation in each time interval based on a preset fixed time interval, and determine the collaborative operation data of the terminal 1. Therefore, when the time interval is short or duration of a collaborative operation (for example, line marking) is long, the terminal 1 determines collaborative operation data in each time interval within the duration of the collaborative operation. In the implementation, the terminal 1 may send the collaborative operation data to the other terminal immediately after determining the collaborative operation data each time, so that the other terminal may view in real time the line marking process performed by the terminal 1 at the conference site.

S415 and S416. The terminal 1 sends the media stream including the first collaborative operation data and/or the media stream including the second collaborative operation data to the MCU; and the MCU sends the media stream including the first collaborative operation data and/or the media stream including the second collaborative operation data to the terminal 2.

In an example, the terminal 1 may perform processing such as compression and encapsulation on the first collaborative operation data and/or the second collaborative operation data based on the parameter negotiated in S401; and send the processed media stream that includes the first collaborative operation data and/or the second collaborative operation data to the MCU.

It should be noted that the terminal 1 needs to carry the media stream identifier of the first collaborative operation data when sending the media stream that includes the first collaborative operation data. As described above, in some implementations, if the first collaborative operation data is transmitted through an independent transmission channel, the media stream identifier may be an address of the transmission channel. However, in some implementations, the terminal 1 may encapsulate an identifier of the first collaborative operation data negotiated with the MCU in S401 into the media stream. In this way, the other terminal may correctly identify the first collaborative operation data and the second collaborative operation data.

Similarly, the terminal 1 also needs to carry the media stream identifier of the second collaborative operation data when sending the media stream including the first collaborative operation data. In this way, when receiving the media stream, the other terminal may correctly identify the media stream of the first collaborative operation data and the media stream of the second collaborative operation data. Optionally, the MCU may further locally cache the received first collaborative operation data and/or second collaborative operation data for a preset time period. In this way, when a new terminal accesses the conference, the MCU may directly send the locally cached collaborative operation data to the new terminal, so that the new terminal may also view the collaborative operation in real time.

S417. The terminal 1 displays a first collaborative operation on the first shared screen content, and/or displays a second collaborative operation on the second shared screen.

If the collaborative operation data determined by the terminal 1 includes the first collaborative operation data, the first collaborative operation may be displayed on the first shared screen content based on the first collaborative data.

In an example, the terminal 1 may determine a display location of the first collaborative operation based on coordinate information in the first collaborative operation data, and may further determine other display parameters of the first collaborative operation based on a type and other parameter information in the first collaborative operation data, for example, a thickness and a color of a displayed line, or inserted content and a font size and a color of the inserted content. Further, the terminal 1 may render the first collaborative operation based on the display location of the first collaborative operation and the other display parameters, and display the first collaborative operation on the first shared screen content.

It should be noted that when determining the display location of the first collaborative operation based on the coordinate information in the first collaborative operation data, the terminal 1 needs to first convert the coordinate information in the first collaborative operation data into corresponding physical coordinates (for example, coordinates on the display). The conversion process is similar to a principle of converting the physical coordinates of the first collaborative operation into coordinates of the first collaborative operation on a first shared screen in S414. This is not described again. It may be understood that in this embodiment, because the terminal 1 has obtained the physical coordinates of the first collaborative operation in a process of determining the first collaborative operation data, the display location of the first collaborative operation may be directly determined based on the known physical coordinates, and the foregoing process of converting the coordinate information in the first collaborative operation data into the corresponding physical coordinates does not need to be performed.

Similarly, if the collaborative operation further includes the second collaborative operation, the terminal 1 displays the second collaborative operation on the second shared screen content based on a similar process.

S418. The terminal 2 receives the media stream including the first collaborative operation data and/or the media stream including the second collaborative operation data, and displays the first collaborative operation on the first shared screen content and/or displays the second collaborative operation on the second shared screen content.

The terminal 2 may determine, based on media stream identifier information of the received media stream, whether the received media stream data includes the first collaborative operation data and/or the second collaborative operation data. The terminal 2 may determine an identifier of the received media stream based on an address (an IP address and a port number) of a channel that receives the media stream or media stream identifier information encapsulated in the media stream. If the foregoing received media stream data includes the first collaborative operation data, the first collaborative operation is displayed on the first sharing screen based on the first collaborative operation data.

The process is similar to a process in which the terminal 1 displays the first collaborative operation on the first shared screen content in S417. When determining the display location of the first collaborative operation, the terminal 2 may obtain the physical coordinates of the first collaborative operation on the terminal 2 based on the resolution of the first shared screen content associated with the first collaborative operation data and the display area of the first shared screen content on the terminal 2, to determine the display location. Other processes are not described herein again.

Similarly, the terminal 2 may further determine whether the received collaborative operation data includes the second collaborative operation data, and if the received collaborative operation data includes the second collaborative operation data, the second collaborative operation is displayed on the second shared screen content based on a similar process.

It may be understood that the collaborative operation in S414 to S418 is generated by the conference site of the terminal 1. In a conference process, the participant at the conference site of the terminal 2 may also perform the collaborative operation, and the terminal 1 and the terminal 2 may also simultaneously perform respective collaborative operation. After performing the respective collaborative operation, the terminal 1 and the terminal 2 locally display the respective collaborative operation, determine one or more channels of remote collaborative operation data corresponding to the respective collaborative operation based on the foregoing method, and send the determined one or more channels of remote collaborative operation data to each other, so that the other party may simultaneously view the collaborative operation generated at the local conference site. This implements a multi-channel remote collaborative operation.

In step S407 in the foregoing embodiment, the terminal 2 applies to the host terminal 1 for initiating the second-channel remote collaboration. During actual application, the host terminal 1 may also actively invite the terminal 2 to initiate the second-channel remote collaboration. As shown in S601 and S602 in FIG. 6, a host terminal 1 may send a request message for inviting second-channel remote collaboration to a terminal 2 through an MCU. Correspondingly, as shown in S603 and S604 in FIG. 6, the terminal 2 sends, to the terminal 1 through the MCU, a response message for inviting the second-channel remote collaboration, where the response message may carry result indication information of the request. For example, if the terminal 2 agrees with the request sent by the terminal 1, the returned response message may carry indication information indicating that the request succeeds; otherwise, the returned response message carries indication information indicating that the request fails.

In the foregoing embodiment, the terminal 1 or the terminal 2 may initiate another channel of remote collaboration. However, it should be noted that in this embodiment, the terminal 1 is a host. Therefore, if the terminal 2 initiates another channel of remote collaboration, the terminal 2 may still obtain a permission of initiating another channel of remote collaboration from the host based on the process shown in FIG. 5 or FIG. 6; and if the terminal 1 initiates another channel of remote collaboration, the foregoing process of obtaining a collaboration permission may not be performed.

It may be learned from the foregoing description that the method for displaying conference shared screen content provided in this application helps implement multi-channel remote collaboration in a conference process. This provides better content sharing and remote collaboration experience.

Figure 9:
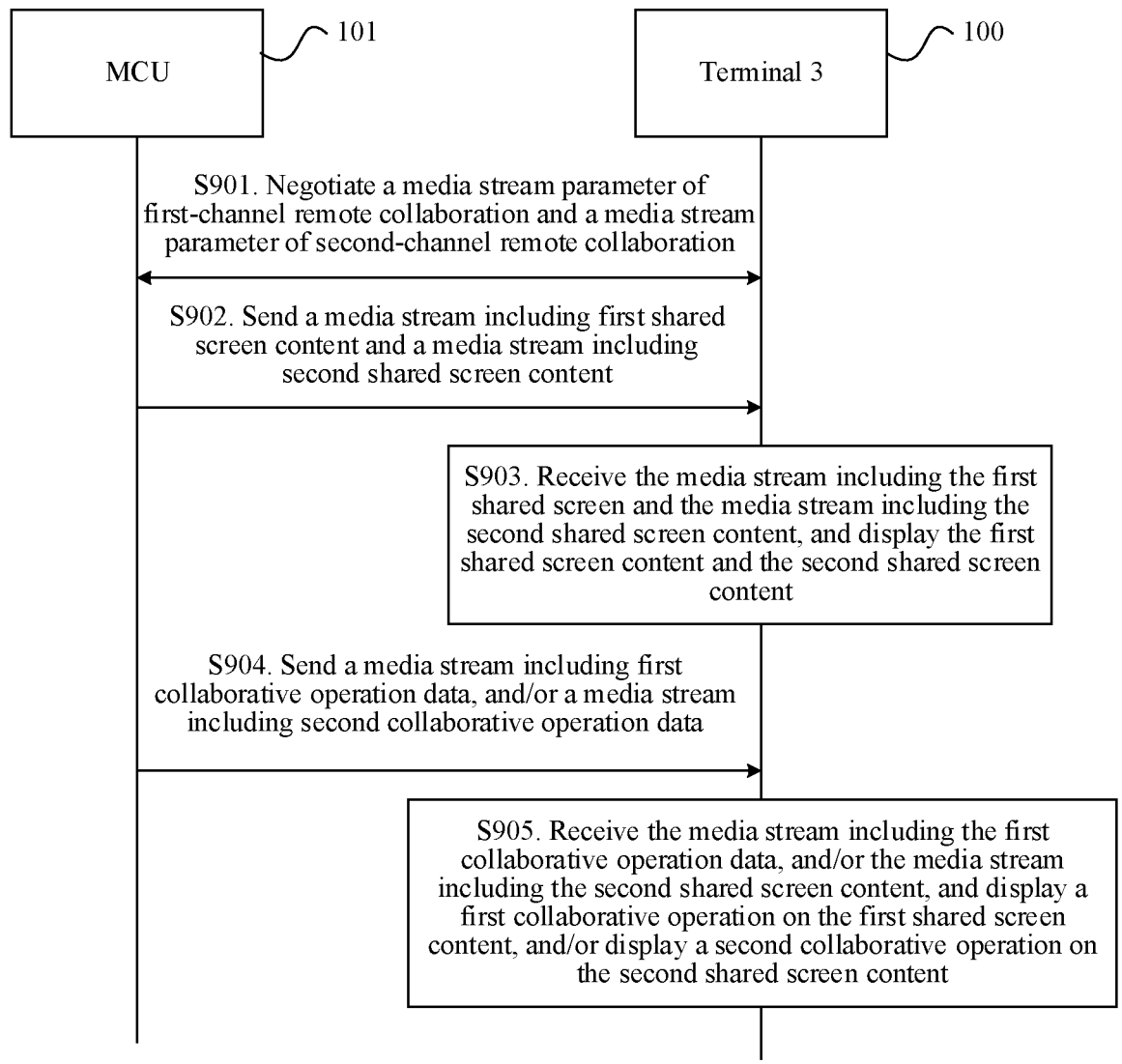
FIG. 9 is a schematic flowchart of a method for displaying conference shared screen content according to an embodiment of this application.

In addition, in the foregoing embodiment, if a terminal 3 accesses the conference after S418, the method shown in FIG. 9 may be used between the MCU and the terminal 3, so that the terminal 3 may also participate in the two channels of remote collaboration content in real time. The method includes but is not limited to the following steps.

S901. An MCU negotiates a media stream parameter of first-channel remote collaboration and a media stream parameter of second-channel remote collaboration with a terminal 3.

The process is similar to a process in which the MCU negotiates the first-channel media stream parameter with the terminal 2 in S402, and details are not described again.

S902. The MCU sends a media stream including first shared screen content and a media stream including second shared screen content to the terminal 3.

The MCU may send locally cached media streams that respectively include the two channels of shared screen content to the terminal 3. In some implementations, when the MCU does not locally cache the media streams that respectively include the two channels of shared screen content, the MCU may separately obtain the two channels of media streams from the terminal 1 and the terminal 2, and then send the two channels of media streams to the terminal 3.

S903. The terminal 3 receives the media stream including the first shared screen content and the media stream including the second shared screen content, and displays the first shared screen content and the second shared screen content.

For a process in which the terminal 3 displays the first shared screen content and the second shared screen content based on a preset mode, refer to the description in S412. Details are not described again.

S904. The MCU sends a media stream including first collaborative operation data and/or a media stream including second collaborative operation data to the terminal 3.

Similar to the description in S902, the MCU may send the one or more channels of remote collaborative operation data sent by the terminal 1 and cached locally, or obtain the one or more channels of remote collaborative operation data from the terminal 1, and then send the one or more channels of remote collaborative operation data to the terminal 3.

S905. The terminal 3 receives the media stream including the first collaborative operation data and/or the media stream including the second collaborative operation data, and displays a first collaborative operation on the first shared screen content, and/or displays a second collaborative operation on the second shared screen content.

The process is similar to the process described in S418, and details are not described again.

In addition, in an actual scenario, the terminal 3 may not support multi-channel remote collaboration. For example, the terminal 3 does not support display processing of multi-channel shared screen content, and processing of the multi-channel remote collaborative operation data. In this case, the method shown in FIG. 10 may be used to enable the terminal 3 to still participate in the foregoing multi-channel remote collaboration when the terminal 3 does not support the multi-channel remote collaboration. The method includes but is not limited to the following steps.

S1001. An MCU combines first shared screen content and second shared screen content to obtain one channel of shared screen content.

When receiving a media stream of first shared screen content sent by a terminal 1, or when receiving a media stream of second shared screen content sent by a terminal 2, the MCU may combine a picture (referred to as a "first picture" below) in the media stream of the first shared screen content and a picture (referred to as a "second picture" below) in the media stream of the second shared screen content into one frame of picture (referred to as a "third picture" below). The first picture and the second picture are usually current pictures (for example, latest pictures) in the media stream of the first shared screen content and the media stream of the second shared screen content respectively. It may be understood that the third picture is a frame of image in the combined media stream of one channel of shared screen content, and the MCU may perform this step a plurality of times in a remote collaboration process.

In an example, the MCU may process the foregoing combination process based on the following method. A first parameter may be predefined, where the first parameter may include. a resolution of the third picture, display area information of the first picture in the third picture, and display area information of the second picture in the third picture. The MCU may perform processing such as zooming and splicing on the first picture and the second picture based on the first parameter to obtain the third picture.

It may be understood that the first parameter may be predefined, or may be obtained by the MCU through negotiation with the terminal 3 before performing this step.

Optionally, the MCU may further first perform processing such as decoding on the media stream of the first shared screen content or the second shared screen content to obtain the first picture and the second picture, and then perform the foregoing combination process.

In addition, optionally, before performing this step, the MCU may further first perform capability negotiation with the terminal 3, to confirm that the terminal 3 does not support multi-channel remote collaboration.

S1002. The MCU sends a media stream including combined one channel of shared screen content to the terminal 3.

Optionally, the MCU may perform processing such as compression on the combined one channel of shared screen content, and then send the combined one channel of shared screen content to the terminal 3.

S1003. The terminal 3 receives the media stream including the combined one channel of shared screen content, and displays the combined one channel of shared screen content.

The terminal 3 may display the combined one channel of shared screen content in full screen or in a display area of a display.

S1004. The MCU performs coordinate conversion on first collaborative operation data and/or second collaborative operation data to obtain converted collaborative operation data.

It is assumed that in the embodiment shown in FIG. 4A and FIG. 4B, collaborative operation data generated by the terminal 1 includes the first collaborative operation data.

It may be learned from the foregoing description that coordinate information of the first collaborative operation data is coordinates of the foregoing collaborative operation on the first shared screen content (for example, coordinates of the collaborative operation relative to a coordinate system of the first picture), and the terminal 3 displays two channels of shared screen content based on a format of the third picture. In an example, in this step, the MCU may convert the coordinate information of the first collaborative operation data into coordinates of a coordinate system of the third picture. The process may be obtained after processing such as translation and zooming is performed on coordinate data of the first collaborative operation data based on the first parameter (for example, based on the display area information of the first picture in the third picture in the first parameter). For a process, refer to related descriptions of converting physical coordinates of the collaborative operation data into coordinates of the collaborative operation data on the shared screen content in S414, and details are not described again.

Similarly, if the collaborative operation data generated by the terminal 1 includes the first collaborative operation data, the MCU may also convert coordinate information of the second collaborative operation data into coordinates in the coordinate system of the third picture based on a similar process.

S1005. The MCU sends a media stream including the converted collaborative operation data to the terminal 3.

S1006. The terminal 3 receives the media stream including the converted collaborative operation data, and displays a collaborative operation on the combined one channel of shared screen content based on the converted collaborative operation data.

The terminal 3 converts, based on a resolution of the combined one channel of shared screen content (for example, a resolution of the third picture), and a display area of the shared screen content on the display, the coordinate information in the converted collaborative operation data received from the MCU into coordinates on the display of the terminal 3, to determine a display location of the received collaborative operation. Further, the terminal 3 may further determine other display parameters of the collaborative operation based on a type and other parameter information in the received collaborative operation data.

For the foregoing process, refer to the description in S417. Details are not described again.

S1007. The terminal 3 obtains a local collaborative operation, and determines third collaborative operation data.

The terminal 3 obtains a collaborative operation of a participant at a local conference site, and determines third collaborative operation data of the collaborative operation. The third collaborative operation data includes coordinates (for example, the coordinates in the coordinate system of the third picture) of the collaborative operation on the combined one channel of shared screen content. In an example, the terminal 3 may obtain coordinates (for example, physical coordinates of the collaborative operation) of the collaborative operation on the display of the terminal 3 based on a mouse, a touch event, or the like generated by the collaborative operation, and then based on a conversion relationship between a coordinate range of the third picture (which may be obtained through the resolution of the third picture) and a physical coordinate range of the third picture (which may be obtained through the display area information of the third picture on the display of the terminal 3), convert the physical coordinates of the collaborative operation into coordinates of the collaborative operation in the coordinates of the third picture.

Similar to the description in S414, the third collaborative operation data may further include a type of the collaborative operation and other parameter information. Details are not described again.

S1008. The terminal 3 sends a media stream including the third collaborative operation data to the MCU.

Optionally, the terminal 3 may perform processing such as compression and encapsulation on the third collaborative operation data, and then send the third collaborative operation data to the MCU.

S1009. The MCU converts the third collaborative operation data into the first collaborative operation data and/or the second collaborative operation data.

The MCU first splits, based on the coordinate information of the third collaborative operation data, and the display area information of the first picture and the display area information of the second picture in the third picture in the first parameter, the third collaborative operation data into first collaborative operation data associated with the first shared screen content and/or second collaborative operation data associated with the second shared screen content.

If the third collaborative operation data includes the first collaborative operation data, the MCU may convert coordinates in the first collaborative operation data into the coordinates in the first collaborative operation data on the first shared screen content. The process may be obtained through a conversion relationship between a coordinate range of the first shared screen content (which may be obtained through a resolution of the first shared screen content) and a coordinate range of the first picture in the third picture (which may be obtained through the display area information of the first picture in the third picture in the first parameter). A specific process is not described again.

Similarly, if the third collaborative operation data includes the second collaborative operation data, the MCU may further convert coordinates in the second collaborative operation data into the coordinates in the second collaborative operation data on the second shared screen content.

S1010. The MCU sends a media stream including the first collaborative operation data and/or a media stream including the second collaborative operation data to the terminal 1 and the terminal 2.

By performing this step, the terminal 1 and the terminal 2 may receive the first collaborative operation data and/or the second collaborative operation data, and display a first collaborative operation on the first shared screen content, and/or display a second collaborative operation on the second shared screen, so that a participant at a conference site in which the terminal 1 and the terminal 2 are located may view a collaborative operation generated at a conference site in which the terminal 3 is located.

Figure 10:
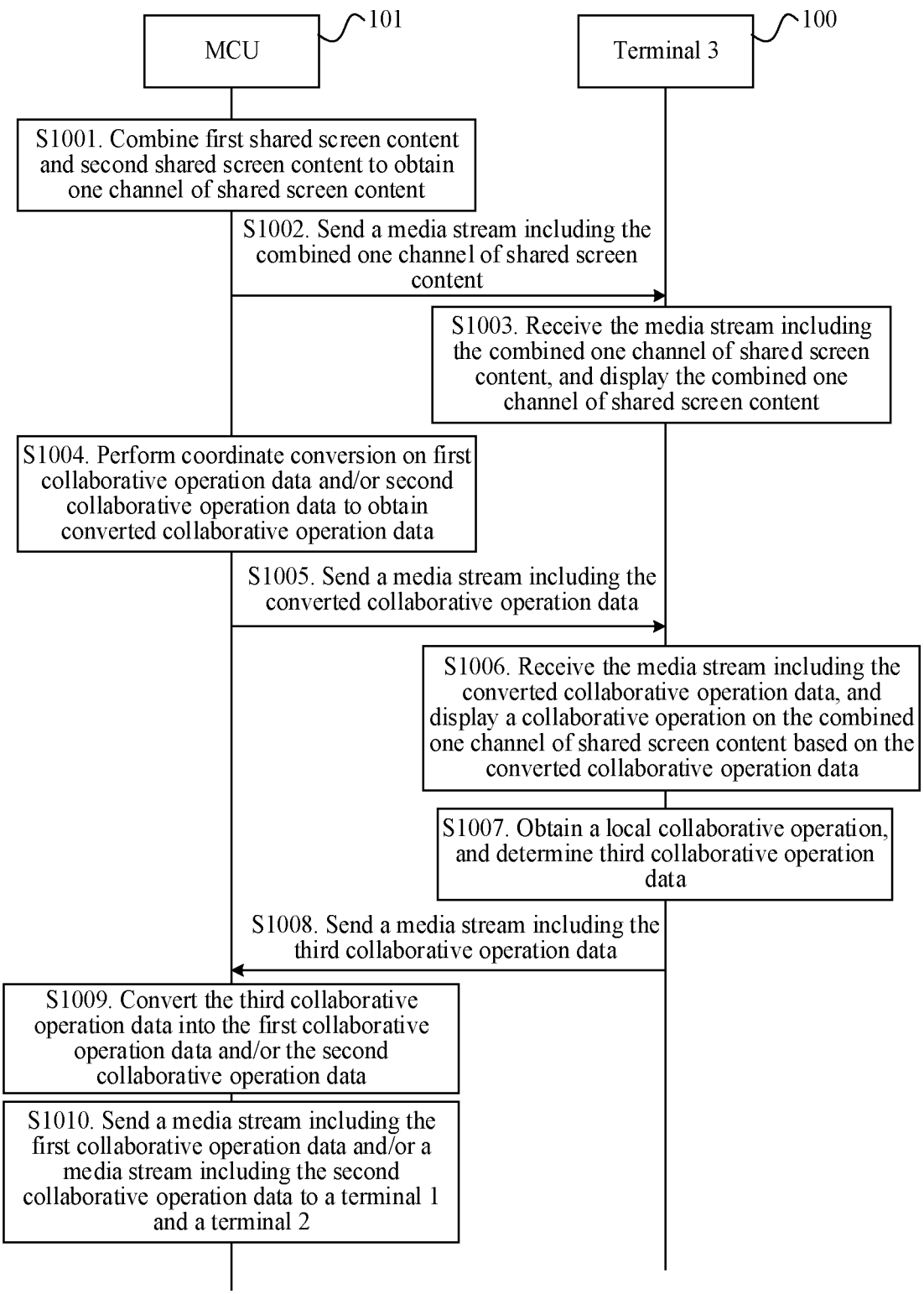
FIG. 10 is a schematic flowchart of a method for displaying conference shared screen content according to an embodiment of this application.

It may be learned that according to the method described in FIG. 10, the MCU performs combination processing on multi-channel shared screen content, and performs combination or splitting processing on multi-channel remote collaborative operation data, so that the terminal 3 that does not support multi-channel remote collaboration may also participate in the foregoing multi-channel remote collaboration. This improves applicability and participant experience.

One channel of shared screen content is formed, and the two channels of remote collaborative operation data are combined into one channel of remote collaborative operation data, and are sent to the terminal 3.

The foregoing embodiment is described based on the architecture of the system shown in FIG. 2. It may be understood that the method for displaying conference shared screen content provided in this application may also be implemented based on the architecture of the system shown in FIG. 3. In the implementation, the MCU does not need to forward a message and content between the terminal 1 and the terminal 2. In an example, when the terminal 1 initiates first channel remote collaboration, the terminal 1 may directly negotiate a media stream parameter of the first-channel remote collaboration with the terminal 2, and then directly send the first shared screen content to the terminal 2; or the terminal 2 may directly apply to the terminal 1 for initiating second-channel remote collaboration, and after negotiating a media stream parameter of the second-channel remote collaboration with the terminal 1, directly send the second shared screen content to the terminal 1. Similarly, for the collaborative operation data, the terminal 1 and the terminal 2 directly send the determined collaborative operation data to each other. For an implementation process, refer to the description of the method in FIG. 4A and FIG. 4B. Details are not described again.

Figure 11:
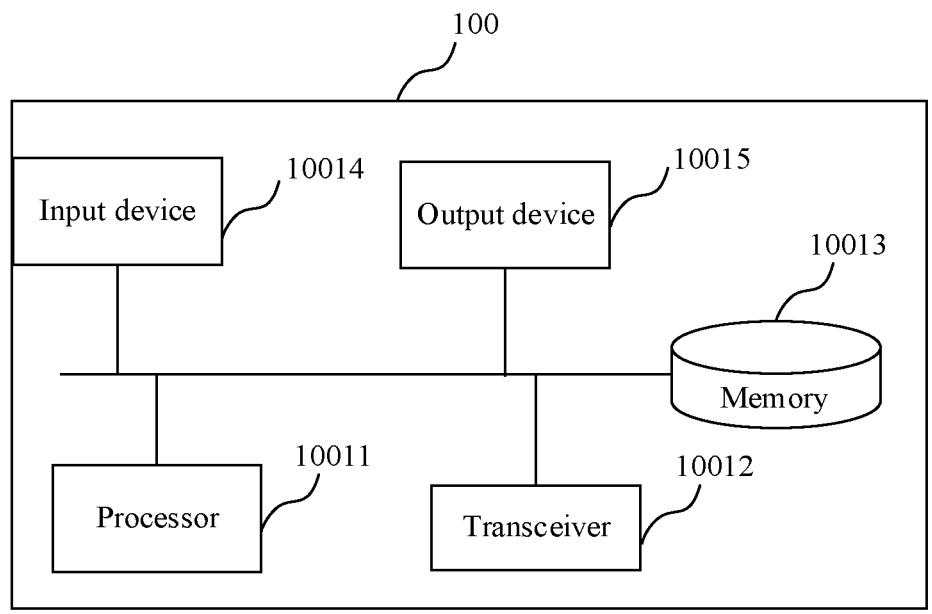
FIG. 11 is a schematic diagram of a structure of a conference terminal according to an embodiment of this application.

This application further provides a terminal. The terminal may be configured to perform the methods performed by the terminal 100 in FIG. 4A and FIG. 4B to FIG. 6, FIG. 9 and FIG. 10. FIG. 11 is a schematic diagram of a structure of a terminal 100 according to this application. The terminal 100 includes a processor 10011, a transceiver 10012, a memory 10013, an input device 10014, and an output device 10015.

The processor 10011 may be a controller, a central processing unit (CPU), a general-purpose processor, a digital signal processor (DSP), an application-specific integrated circuit (ASIC), a field-programmable gate array (FPGA), another programmable logic device, a transistor logic device, a hardware component, or any combination thereof. The processor 10011 may implement or execute various example logical blocks, modules, and circuits described with reference to content disclosed in the embodiments of the present disclosure. The processor 10011 may be alternatively a combination to implement a computing function, for example, may be a combination of one or more microprocessors, or a combination of a DSP and a microprocessor.

The transceiver 10012 may be a communication module or a transceiver circuit, and is configured to communicate with another device or a communication network.

The memory 10013 may be a read-only memory (ROM) or another type of static storage device that can store static information and instructions, a random-access memory (RAM) or another type of dynamic storage device that can store information and instructions, or may be an electrically-erasable programmable read-only memory (EEPROM), a compact disc read-only memory (CD-ROM) or another optical disc storage, an optical disc storage (including a compact disc, a laser disc, an optical disc, a digital versatile disc, a BLU-RAY disc, or the like), a magnetic disk storage medium, or another magnetic storage device, or any other medium that can be used to carry or store expected program code in a form of instructions or a data structure and can be accessed, but is not limited thereto. The memory 10013 may be independent of the processor 10011, may be connected to the processor 10011 through a communication bus, or may be integrated with the processor 10011. The memory 10013 is configured to store data, instructions, or program code. When invoking and executing the instructions or the program code stored in the memory 10013, the processor 10011 may implement the method for displaying conference shared screen content provided in embodiments of this application.

The input device 10014 may include one or more of an image collector (for example, a camera), an audio collector (for example, a microphone), a collaborative operation event collector (for example, a mouse, a keyboard, or a touchpad), or the like. The input device 10014 is configured to collect image data and audio data at a conference site, or related data of a collaborative operation of a participant, and transfer the data to the processor 10011 for processing.

The output device 10015 may include a display, a speaker, and the like. The display is configured to display data transferred by the processor 10011 to the video memory, for example, multi-channel shared screen content, or a collaborative operation performed by a participant on the multi-channel shared screen content. The speaker is configured to convert an electronic signal of a processed output sound into a sound, so that a user can hear the sound.

It should be understood that the processor 10011, the transceiver 10012, and the memory 10013 may be connected through a bus; and the processor 10011 and the output device 10015, and the processor 10011 and the input device 10014 may be connected through the bus, a physical interface (for example, an HDMI), or a network.

It should be noted that the schematic diagram of the structure shown in FIG. 11 does not constitute a limitation on embodiments of this application. During actual application, the terminal 100 may further include another component.

It should be further noted that the terminal 100 provided in this application may be a split terminal device. In this case, the terminal 100 may include a plurality of physical devices. Alternatively, the terminal 100 may be an integrated terminal device. In this case, the terminal 100 may be a physical device.

In addition, in embodiments of this application, the terminal 100 may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 12:
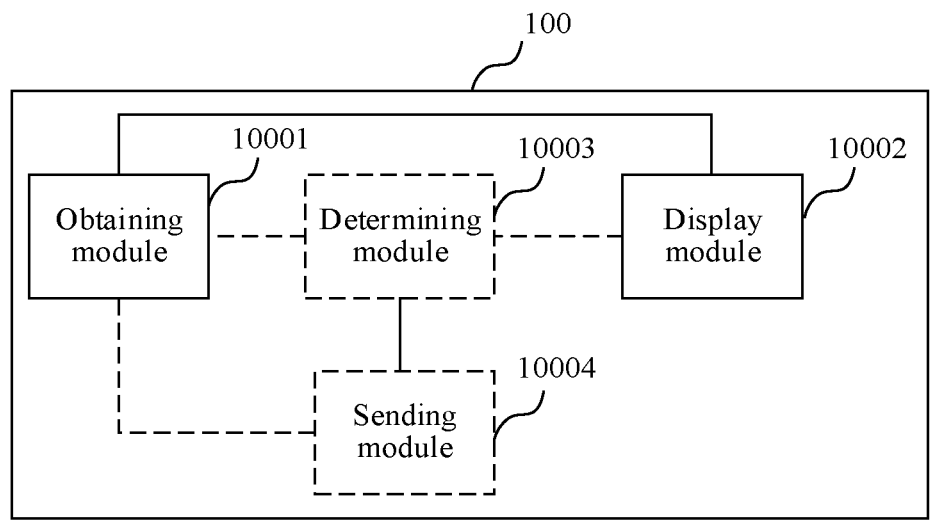
FIG. 12 is another schematic diagram of a structure of a conference terminal according to an embodiment of this application.

FIG. 12 is a schematic diagram of a logical structure of a terminal 100 according to an embodiment of this application. It is assumed that the terminal 100 is a terminal 1, and a terminal 2 further participates in a same conference with the terminal 1. In this case, the terminal 1 may include an obtaining module 10001 and a display module 10002.

The obtaining module 10001 is configured to obtain first shared screen content and second shared screen content in the conference; and is further configured to obtain collaborative operation data, where the collaborative operation data includes first collaborative operation data associated with the first shared screen content.

The display module 10002 is configured to display the first shared screen content and the second shared screen content; and is further configured to display a first collaborative operation on the first shared screen content based on the first collaborative operation data.

When obtaining the first shared screen content and the second shared screen content, the obtaining module 10001 may obtain first shared screen content of a local conference site, and receive second shared screen content from the terminal 2. In this case, the terminal 1 may further include a sending module 10004, configured to send the first shared screen content, to enable the terminal 2 to display the first shared screen content and the second shared screen content.

When obtaining the first shared screen content and the second shared screen content, the obtaining module 10001 may further obtain the first shared screen content and the second shared screen content of the local conference site. In this case, the terminal 1 may further include the sending module 10004, configured to send the two channels of shared screen content, to enable the terminal 2 to display the two channels of shared screen content.

When displaying the two channels of shared screen content, the display module 10002 may display the two channels of shared screen content in an up-down or a left-right side by side manner, or display one of the two channels of shared screen content.

The terminal 100 may further include a determining module 10003. The first collaborative operation data includes coordinate information of the first collaborative operation on the first shared screen content, and a process of obtaining the collaborative operation data by the obtaining module 10001 may be, when detecting a collaborative operation of a local conference site, indicating the determining module 10003 to determine coordinate information of the collaborative operation on the terminal 1, determining that the collaborative operation includes the first collaborative operation on the terminal 1 based on the coordinate information and display area information of the two channels of shared screen content, and determining coordinate information of the first collaborative operation on the terminal 1; and determining the coordinate information of the first collaborative operation on the first shared screen content based on the coordinate information of the first collaborative operation on the terminal 1, a display area of the first shared screen content, and a resolution of the first shared screen content. In this case, the sending module 10004 may further send the first collaborative operation data, so that another terminal may also display the first collaborative operation on a first shared screen.

Figure 13:
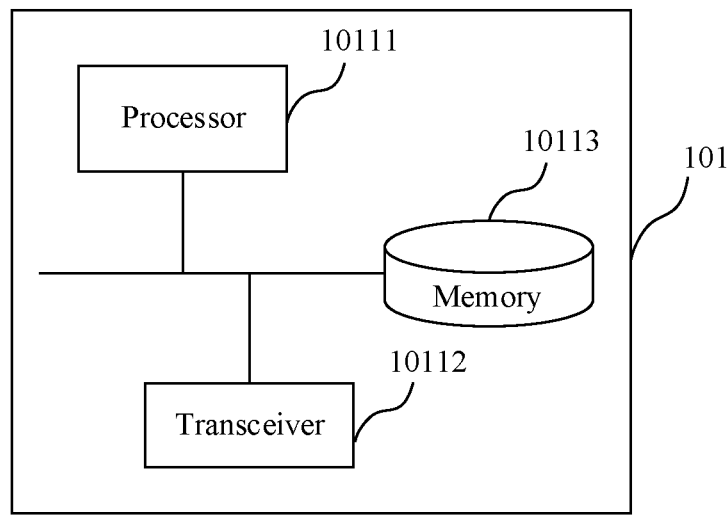
FIG. 13 is a schematic diagram of a structure of an MCU according to an embodiment of this application.

In addition, this application further provides an MCU. The MCU may be configured to perform the methods performed by the terminal MCU 101 in FIG. 4A and FIG. 4B to FIG. 6, FIG. 9 and FIG. 10. FIG. 13 is a schematic diagram of a structure of an MCU 101 according to this application. The MCU 101 includes a processor 10111, a transceiver 10112, and a memory 10113.

The processor 10111 may be a controller, a central processing unit (CPU), a general-purpose processor, a DSP, an ASIC, an FPGA, another programmable logic device, a transistor logic device, a hardware component, or any combination thereof. The processor 10111 may implement or execute various example logical blocks, modules, and circuits described with reference to content disclosed in the embodiments of the present disclosure. The processor 10111 may be alternatively a combination to implement a computing function, for example, may be a combination of one or more microprocessors, or a combination of a DSP and a microprocessor.

The transceiver 10112 may be a communication module or a transceiver circuit, and is configured to communicate with another device or a communication network.

The memory 10113 may be a ROM or another type of static storage device that can store static information and instructions, a RAM or another type of dynamic storage device that can store information and instructions, or may be an EEPROM, a CD-ROM or another optical disc storage, an optical disc storage (including a compact disc, a laser disc, an optical disc, a digital versatile disc, a BLU-RAY disc, or the like), a magnetic disk storage medium, or another magnetic storage device, or any other medium that can be used to carry or store expected program code in a form of instructions or a data structure and can be accessed, but is not limited thereto. The memory 10113 may be independent of the processor 10111, may be connected to the processor 10111 through a communication bus, or may be integrated with the processor 10111. The memory 10113 is configured to store data, instructions, or program code. When invoking and executing the instructions or the program code stored in the memory 10113, the processor 10111 may implement the method for displaying conference shared screen content provided in embodiments of this application.

It should be understood that a schematic diagram of a structure shown in FIG. 13 does not constitute a limitation on embodiments of this application. During actual application, the MCU 101 may further include another component.

In addition, in embodiments of this application, the MCU 101 may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 14:
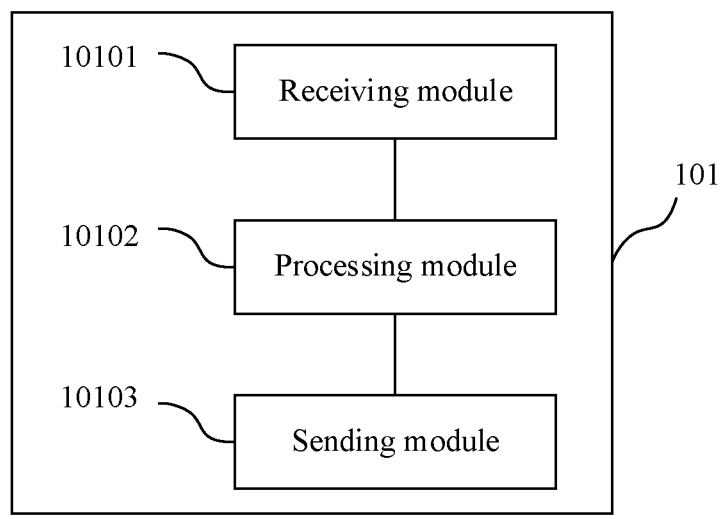
FIG. 14 is another schematic diagram of a structure of an MCU according to an embodiment of this application.

FIG. 14 is a schematic diagram of a logical structure of an MCU 101 according to an embodiment of this application. The MCU 101 may include a receiving module 10101, a processing module 10102, and a sending module 10103.

The receiving module 10101 is configured to receive first shared screen content and second shared screen content; and is further configured to receive first collaborative operation data;

the processing module 10102 is configured to combine the first shared screen content and the second shared screen content into third shared screen content based on a first parameter; and is further configured to determine second collaborative operation data based on the first collaborative operation data and the first parameter; and the sending module 10103 is configured to send the third shared screen content and the second collaborative operation data.

The first parameter may include a resolution of the third shared screen content, display area information of the first shared screen content on the third shared screen content, and display area information of the second shared screen content on the third shared screen content. It may be understood that the first parameter may be a preset parameter, or may be obtained by the MCU 101 through negotiation with the terminal.

In a possible manner, the first collaborative operation data includes first location information, and the first location information is location information of a first collaborative operation on first shared screen content; the second collaborative operation data includes second location information, and the second location information is location information of the first collaborative operation on the third shared screen content; in this case, that the processing module 10102 determines the second collaborative operation data based on first collaborative operation data and the first parameter includes determining the second location information based on the first location information, the display area information of the first shared screen content on the third shared screen content, and a resolution of the first shared screen content.

In another possible manner, the first collaborative operation data includes first location information, and the first location information is location information of a first collaborative operation on third shared screen content; the second collaborative operation data includes second location information, and the second location information is location information of a second collaborative operation on the first shared screen content; the second collaborative operation is a part or all of the first collaborative operation; in this case, that the processing module 10102 determines second collaborative operation data based on the first collaborative operation data and the first parameter includes determining the location information of the second collaborative operation on the third shared screen content based on the first location information and display area information of the first shared screen content on the third shared screen content; and then determining the second location information based on the location information of the second collaborative operation on the third shared screen content, the display area information of the first shared screen content on the third shared screen content, and a resolution of the first shared screen content.

Another embodiment of this application further provides a computer-readable storage medium, where the computer-readable storage medium stores instructions; and when the instructions are run on a computer device, the computer device may perform the steps performed by the terminal or the MCU in the foregoing method embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely implementations of this application. Any variation or replacement readily figured out by a person skilled in the art based on the implementations provided in this application shall fall within the protection scope of this application.

What is claimed is:

1. A method applied to a first terminal and comprising:
   obtaining first shared screen content in a conference;
   displaying the first shared screen content and second shared screen content in the conference;
   detecting a first operation being performed at a local conference site and on the first shared screen content;
   obtaining first operation data associated with the first operation in response to the first operation being performed on the first shared screen content, wherein the first operation data comprises first location information that describes location information of the first operation on the first shared screen content;
   determining location information of the first operation on the first terminal;
   determining the first location information based on the location information of the first operation on the first terminal, display area information of the first shared screen content, display area information of the second shared screen content, and a resolution of the first shared screen content; and
   displaying the first operation on the first shared screen content based on the first operation data.

2. The method of claim 1, further comprising:
   obtaining the first shared screen content from the local conference site; and
   receiving, from a second terminal that participates in the conference, the second shared screen content.

3. The method of claim 1, further comprising:
   obtaining the first shared screen content in the conference of the local conference site;
   obtaining the second shared screen content in the conference of the local conference site; and
   sending, to a second terminal, the first shared screen content and the second shared screen content to enable the second terminal to display the first shared screen content and the second shared screen content.

4. The method of claim 1, wherein the first operation on the first shared screen content that is based on the first operation data comprises second location information that is based on the first location information, the display area information of the first shared screen content on the first terminal, and the resolution of the first shared screen content, wherein the second location information is display location information of the first operation on the first terminal, and wherein the method further comprises displaying the first operation based on the second location information.

5. The method of claim 1, wherein obtaining the first operation data associated with the first shared screen content comprises:
   detecting a second operation of the local conference site;
   obtaining location information of the second operation on the first terminal;
   obtaining the location information of the first operation on the first terminal and location information of a third operation on the first terminal based on the location information of the second operation on the first terminal, the display area information of the first shared screen content, and the display area information of the second shared screen content, wherein the first operation is a first part of the second operation, and wherein the third operation is a second part of the second operation; and
   obtaining the first location information based on the location information of the first operation on the first terminal, the display area information of the first shared screen content, and the resolution of the first shared screen content.

6. The method of claim 1, wherein after obtaining the first operation data associated with the first shared screen content, the method further comprises sending, to a second terminal, the first operation data comprising a media stream identifier of the first operation data to enable the second terminal to display the first operation on the first shared screen content based on the first operation data.

7. A first terminal, comprising:
one or more memories configured to store executable instructions; and
one or more processors coupled to the one or more memories and configured to execute the executable instructions to cause the first terminal to:
obtain first shared screen content in a conference;
display the first shared screen content and second shared screen content in the conference;
detect a first operation being performed at a local conference site and on the first shared screen content;
obtain first operation data associated with the first operation in response to the first operation being performed on the first shared screen content, wherein the first operation data comprises first location information that describes location information of the first operation on the first shared screen content;
determine location information of the first operation on the first terminal;
determine the first location information based on the location information of the first operation on the first terminal, display area information of the first shared screen content, display area information of the second shared screen content, and a resolution of the first shared screen content; and
display the first operation on the first shared screen content based on the first operation data.

8. The first terminal of claim 7, wherein the executable instructions that when executed by the one or more processors further cause the first terminal to:
obtain the first shared screen content of the local conference site; and
receive the second shared screen content from a second terminal that participates in the conference.

9. The first terminal of claim 7, wherein the executable instructions that when executed by the one or more processors further cause the first terminal to:
obtain the first shared screen content in the conference of the local conference site;
obtain the second shared screen content in the conference of the local conference site; and
send the first shared screen content and the second shared screen content to a second terminal to enable the second terminal to display the first shared screen content and the second shared screen content.

10. The first terminal of claim 9, wherein the executable instructions that when executed by the one or more processors further cause the first terminal to:
detect a second operation of the local conference site;
obtain location information of the second operation on the first terminal;
obtain the location information of the first operation on the first terminal and location information of a third operation on the first terminal based on the location information of the second operation on the first terminal, the display area information of the first shared screen content, and the display area information of the second shared screen content, wherein the first operation is a first part of the second operation, and wherein the third operation is a second part of the second operation; and
obtain the first location information based on the location information of the first operation on the first terminal, the display area information of the first shared screen content, and the resolution of the first shared screen content.

11. The first terminal of claim 7, wherein the executable instructions that when executed by the one or more processors further cause the first terminal to:
determine second location information based on the first location information, the display area information of the first shared screen content on the first terminal, and the resolution of the first shared screen content, wherein the second location information is display location information of the first operation on the first terminal; and
display the first operation based on the second location information.

12. The first terminal of claim 7, wherein after obtaining the first operation data associated with the first shared screen content, the executable instructions that when executed by the one or more processors further cause the first terminal to send the first operation data comprising a media stream identifier of the first operation data to a second terminal to enable the second terminal to display the first operation on the first shared screen content based on the first operation data.

13. A computer program product comprising computer-executable instructions that are stored on a non-transitory computer-readable storage medium and that, when executed by one or more processors, cause a first terminal to:
obtain first shared screen content in a conference;
display the first shared screen content and a second shared screen content in the conference;
detect a first operation being performed at a local conference site and on the first shared screen content;
obtain first operation data associated with the first operation in response to the first operation being performed on the first shared screen content, wherein the first operation data comprises first location information that describes location information of the first operation on the first shared screen content;
determine location information of the first operation on the first terminal;
determine the first location information based on the location information of the first operation on the first terminal, display area information of the first shared screen content, display area information of the second shared screen content, and a resolution of the first shared screen content; and
display the first operation on the first shared screen content based on the first operation data.

14. The computer program product of claim 13, wherein the computer-executable instructions that when executed by the one or more processors further cause the first terminal to:
obtain the first shared screen content of the local conference site; and
receive the second shared screen content from a second terminal that participates in the conference.

15. The computer program product of claim 13, wherein the computer-executable instructions that when executed by the one or more processors further cause the first terminal to:
obtain the first shared screen content in the conference of the local conference site;

obtain the second shared screen content in the conference of the local conference site; and send the first shared screen content and the second shared screen content to a second terminal to enable the second terminal to display the first shared screen content and the second shared screen content.

16. The computer program product of claim 13, wherein the computer-executable instructions that when executed by the one or more processors further cause the first terminal to:

obtain the first shared screen content in the conference of the local conference site;

obtain the second shared screen content in the conference of the local conference site; and send, to a second terminal, the first shared screen content and the second shared screen content to enable the second terminal to display the first shared screen content and the second shared screen content.

17. The computer program product of claim 13, wherein the first operation on the first shared screen content based on the first operation data comprises second location information based on the first location information, the display area information of the first shared screen content on the first terminal, and the resolution of the first shared screen content, wherein the second location information is display location information of the first operation on the first terminal, and wherein the computer-executable instructions that when executed by the one or more processors further cause the first terminal to display the first operation based on the second location information, and wherein the computer-executable instructions that when executed by the one or more processors further cause the first terminal to display the first operation based on the second location information.

18. The computer program product of claim 13, wherein the computer-executable instructions that when executed by the one or more processors further cause the first terminal to obtain the first operation data associated with the first shared screen content by:

detecting a second operation of the local conference site;

obtaining location information of the second operation on the first terminal;

obtaining the location information of the first operation on the first terminal and location information of a third operation on the first terminal based on the location information of the second operation on the first terminal, the display area information of the first shared screen content, and the display area information of the second shared screen content, wherein the first operation is a first part of the second operation, and wherein the third operation is a second part of the second operation; and obtaining the first location information based on the location information of the first operation on the first terminal, the display area information of the first shared screen content, and the resolution of the first shared screen content.

19. The computer program product of claim 13, wherein after obtaining the first operation data associated with the first shared screen content, the computer-executable instructions that when executed by the one or more processors further cause the first terminal to send, to a second terminal, the first operation data comprising a media stream identifier of the first operation data to enable the second terminal to display the first operation on the first shared screen content based on the first operation data.

* * * * *